(12) United States Patent
Towne

(10) Patent No.: US 8,167,586 B2
(45) Date of Patent: May 1, 2012

(54) VALVE ASSEMBLY WITH LOW RESISTANCE PILOT SHIFTING

(75) Inventor: Lloyd I. Towne, Bryan, OH (US)

(73) Assignee: Ingersoll-Rand Company, Montvale, NJ (US)

( * ) Notice: Subject to any disclaimer, the term of this patent is extended or adjusted under 35 U.S.C. 154(b) by 839 days.

(21) Appl. No.: 12/196,943

(22) Filed: Aug. 22, 2008

(65) Prior Publication Data

US 2010/0043895 A1 Feb. 25, 2010

(51) Int. Cl.
*F04B 43/06* (2006.01)
*F15B 13/04* (2006.01)

(52) U.S. Cl. ...... 417/395; 417/386; 91/313; 137/596.14

(58) Field of Classification Search .......... 417/386, 417/393–395; 137/596, 596.14; 91/313, 91/314, 329
See application file for complete search history.

(56) References Cited

U.S. PATENT DOCUMENTS

| | | | | |
|---|---|---|---|---|
| 3,548,716 A | * | 12/1970 | Rayl | 91/307 |
| 3,652,187 A | * | 3/1972 | Loeffler et al. | 417/393 |
| 4,019,838 A | * | 4/1977 | Fluck | 417/393 |
| 4,854,832 A | * | 8/1989 | Gardner et al. | 417/393 |
| 5,232,352 A | * | 8/1993 | Robinson | 417/393 |
| 5,368,452 A | | 11/1994 | Johnson et al. | |
| 5,391,060 A | | 2/1995 | Kozumplik, Jr. et al. | |
| 5,527,160 A | * | 6/1996 | Kozumplik et al. | 417/46 |
| 5,551,847 A | | 9/1996 | Gardner et al. | |
| 5,567,118 A | * | 10/1996 | Grgurich et al. | 417/46 |
| 5,584,666 A | | 12/1996 | Kozumplik, Jr. et al. | |
| 5,616,005 A | | 4/1997 | Whitehead | |
| 7,025,578 B2 | | 4/2006 | Gardner | |
| 2007/0092385 A1 | | 4/2007 | Petrie Pe | |

* cited by examiner

*Primary Examiner* — Charles Freay
*Assistant Examiner* — Ryan Gatzemeyer
(74) *Attorney, Agent, or Firm* — Michael Best & Friedrich LLP

(57) ABSTRACT

A valve arrangement for placing a supply of motive fluid in alternating communication with first and second motive fluid chambers. The valve arrangement includes a power valve including a supply chamber, a pilot chamber, and a shiftable member separating the supply chamber from the pilot chamber. The valve arrangement also includes a pilot valve actuable between an on condition in which the pilot valve generates a pilot signal that shifts the power valve, and an off condition in which the pilot valve does not generate the pilot signal. At least a portion of the pilot valve is exposed to motive fluid, and the portion of the pilot valve exposed to motive fluid includes surface areas giving rise to a net zero actuating force arising from pressure of the motive fluid. Because there is no biasing force on the pilot valve, the pilot valve is shifted between the on and off conditions without significant resistance.

11 Claims, 22 Drawing Sheets

VALVE ASSEMBLY WITH LOW RESISTANCE PILOT SHIFTING

BACKGROUND

The present invention relates to a valve assembly that includes a pilot valve arrangement to control the flow path of motive fluid. The pilot valve arrangement includes a shifting mechanism that has low or no resistance to shifting.

SUMMARY

In one embodiment, the invention provides a valve arrangement for placing a supply of motive fluid in alternating communication with first and second motive fluid chambers. The valve arrangement of this embodiment comprises a power valve including a supply chamber, a pilot chamber, and a shiftable member separating the supply chamber from the pilot chamber, the supply chamber adapted to constantly communicate with the supply of motive fluid, the shiftable member adapted to shift into a first position in response to the pilot chamber being pressurized with motive fluid and into a second position in response to the pilot chamber being at atmospheric pressure, the shiftable member placing the supply chamber in communication with the first motive fluid chamber in response to the shiftable member being in the first position, and placing the supply chamber in communication with the second motive fluid chamber in response to the shiftable member being in the second position. The valve arrangement further comprises a pilot valve actuable between an on condition in which the pilot valve places the pilot chamber in communication with the supply of motive fluid, and an off condition in which the pilot valve places the pilot chamber in communication with the atmosphere. At least a portion of the pilot valve is exposed to motive fluid, and the portion of the pilot valve exposed to motive fluid includes surface areas giving rise to a net zero actuating force arising from pressure of the motive fluid.

The pilot valve may include an inlet chamber adapted for constant communication with the supply of motive fluid and an exhaust chamber in constant communication with the atmosphere; and the pilot valve may further include a pilot actuator shiftable to alternatingly place the pilot chamber of the power valve in communication with one of the inlet chamber an exhaust chamber to thereby place the pilot valve in the respective on and off conditions. In some embodiments, the inlet chamber of the pilot valve is in constant communication with the supply chamber of the power valve, such that the pilot valve places the pilot chamber of the power valve in communication with the supply chamber of the power valve when the pilot valve is in the on condition. The portion of the pilot valve exposed to motive fluid may include a portion of the pilot actuator extending through the inlet chamber of the pilot valve. The pilot actuator may include a pilot rod having a longitudinal axis, and wherein the pilot rod is actuable in directions parallel to the longitudinal axis to alternatingly place the pilot valve in the on and off conditions.

The pilot valve may further include a pilot piston defining an orifice through which the pilot rod extends; and wherein the pilot piston and pilot rod shift with respect to each other to place the pilot valve in the on and off positions. In some embodiments, the pilot piston may include a gland communicating between the orifice and the pilot chamber; and axial movement of the pilot rod with respect to the pilot piston may selectively place the pilot chamber in communication with one of the inlet chamber and the exhaust chamber through the orifice and gland. A pair of spaced apart seals may be carried by the pilot rod, each creating an impermeable seal between the pilot rod and the pilot piston within the orifice. Actuation of the pilot rod may cause the pair of seals to cut off communication between the pilot chamber and both of the inlet chamber and exhaust chamber through the orifice as the pilot valve is shifted between the on and off conditions. The pair of spaced apart seals prevent the inlet chamber and exhaust chamber of the pilot valve from ever communicating with each other through the orifice.

In some embodiments, the pilot valve includes an outlet chamber constantly communicating between the gland and the pilot chamber; wherein the pilot piston includes a first surface area facing the inlet chamber and a second surface area facing the outlet chamber, the first and second surface areas being unequal; wherein motive fluid acting only on the first surface area shifts the pilot piston in a first direction to increase spacing between the pair of seals and the gland in response to the pilot valve being in the off condition; and wherein motive fluid acting on both the first and second surface areas shifts the pilot piston in a second direction to increase spacing between the pair of seals and the gland in response to the pilot valve being in the on condition.

The invention also provides a pilot valve for turning a pilot signal on and off, the pilot valve comprising: a valve body including an inlet chamber and an outlet chamber, the inlet chamber adapted to be in constant communication with a source of motive fluid; a piston movable within the valve body and including a passageway communicating with the inlet chamber and a gland communicating between the passageway and the outlet chamber; a rod movable within the passageway; and at least one seal carried by the rod and creating an impermeable sliding seal between the rod and piston within the passageway. The rod is actuable in a first direction to move the at least one seal to one side of the gland and place the inlet chamber in communication with the outlet chamber through the passageway and gland, and thereby turn the pilot signal on. The rod is actuable in a second direction to move the at least one seal to a second side of the gland to cut off communication between the inlet chamber and outlet chamber through the passageway and gland, and thereby turn the pilot signal off. A portion of the rod extends into the inlet chamber, and the portion of the rod extending into the inlet chamber has a net zero surface area against which the motive fluid bears, such that the motive fluid does not bias the rod in either of the first and second directions.

In some embodiments, the valve body further includes an exhaust chamber communicating with the passageway; wherein the at least one seal comprises a pair of spaced apart seals; wherein actuation of the pilot rod causes the pair of seals to cut off communication between the outlet chamber and both of the inlet chamber and exhaust chamber through the passageway as the rod is shifted to turn the pilot signal on and off; and wherein the pair of spaced apart seals prevent the inlet chamber and exhaust chamber of the pilot valve from ever communicating with each other through the passageway. In some embodiments, the pilot piston includes a first surface area facing the inlet chamber and a second surface area facing the outlet chamber, the first and second surface areas being unequal; wherein motive fluid acting only on the first surface area shifts the pilot piston in the first direction to increase spacing between the at least one seal and the gland in response to the rod being shifted in the second direction and the at least one seal being moved to the second side of the gland; and wherein motive fluid acting on both the first and second surface areas shifts the pilot piston in the second direction to increase spacing between the pair of seals and the gland in response to the rod being shifted in the first direction and the at least one seal being moved to the first side of the gland.

The invention also provides a double diaphragm pump comprising: first and second diaphragms having first sides at least partially defining respective first and second motive fluid chambers, the first and second diaphragms being coupled for synchronized reciprocal movement; first and second pump chambers at least partially defined by second sides of the diaphragms opposite the first sides, and expanding and contracting to pump a fluid in response to reciprocal movement of the first and second diaphragms; a source of motive fluid; a power valve having an interior space and including a power spool separating the interior space into a supply chamber and a pilot chamber, the supply chamber being in communication with the source of motive fluid, the power spool shifting into a first position in response to pressure in the supply chamber exceeding pressure in the pilot chamber and shifting into a second position in response to pressure in the supply and pilot chambers being substantially equal, the power spool placing the first motive fluid chamber in communication with the source of motive fluid and the second motive fluid chamber in communication with atmosphere in response to moving into the first position, and placing the second motive fluid chamber in communication with the source of motive fluid and the first motive fluid chamber in communication with atmosphere in response to moving into the second position; and a pilot valve having an interior space and a pilot mechanism dividing the interior space into an inlet chamber in communication with the supply chamber, an outlet chamber in communication with the pilot chamber, and an exhaust chamber in communication with atmosphere; wherein the pilot mechanism is movable into an off position to place the outlet chamber in communication with the exhaust chamber to provide atmospheric pressure to the pilot chamber and shift the power valve into the first position, and into an on position to place the outlet chamber in communication with the inlet chamber to provide motive fluid pressure to the pilot chamber and shift the power valve into the second position; and wherein a portion of the pilot mechanism is at least partially exposed to motive fluid pressure in the inlet chamber and has substantially zero net surface area giving rise to biasing forces from pressure in the inlet chamber toward the on and off positions.

In some embodiments, the pilot mechanism includes a rod interconnecting the first and second diaphragms. The pilot mechanism may include a pilot rod having a longitudinal axis, and wherein the pilot rod is actuable in directions parallel to the longitudinal axis into the on and off positions. In some embodiments, the pilot mechanism further includes a pilot piston defining a passageway through which the pilot rod extends; and the pilot piston and pilot rod shift with respect to each other to place the pilot mechanism in the on and off positions. The pilot piston may include a gland communicating between the passageway and the outlet chamber; and wherein axial movement of the pilot rod with respect to the pilot piston selectively places the outlet chamber in communication with one of the inlet chamber and the exhaust chamber through the orifice and gland.

The pump may, in other embodiments, further comprise a pair of spaced apart seals carried by the pilot rod, each creating an impermeable seal between the pilot rod and the pilot piston within the passageway; wherein actuation of the pilot rod causes the pair of seals to cut off communication between the outlet chamber and both of the inlet chamber and exhaust chamber through the passageway in response to the pair of seals being positioned on opposite sides of the gland as the pilot mechanism is shifted between the on and off conditions; and wherein the pair of spaced apart seals prevent the inlet chamber and exhaust chamber of the pilot valve from ever communicating with each other through the passageway.

In other embodiments, the pilot piston includes a first surface area facing the inlet chamber and a second surface area facing the outlet chamber, the first and second surface areas being unequal; wherein motive fluid acting only on the first surface area shifts the pilot piston in a first direction to increase spacing between the pair of seals and the gland in response to the pilot mechanism being in the off condition; and motive fluid acting on both the first and second surface areas shifts the pilot piston in a second direction to increase spacing between the pair of seals and the gland in response to the pilot mechanism being in the on condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The present invention provides a valve arrangement in which a pilot signal (e.g., communication with compressed air or another motive fluid) is turned on and off in response to shifting a pilot valve actuator (e.g., a pilot rod). The valve arrangement of the present invention applies substantially no resistance to shifting the pilot valve actuator. The presence or absence of the pilot signal causes a power valve to shift between first and second positions to direct motive fluid (e.g., compressed air) into respective first and second motive fluid chambers to perform work. Depending on the application in which the valve arrangement is used, the first and second motive fluid chambers may be part of an air motor, a piston pump, a double diaphragm pump, or a combination air motor and pump. The present invention is described with respect to the embodiment of the attached drawing, which illustrates a double diaphragm pump application, but the present invention is not limited to double diaphragm pump applications and may, as noted above, be incorporated into air motors and piston pumps, as well as other motors, pumps, and any other application in which alternating the supply of motive fluid between first and second motive fluid chambers is desired.

Figure 1:
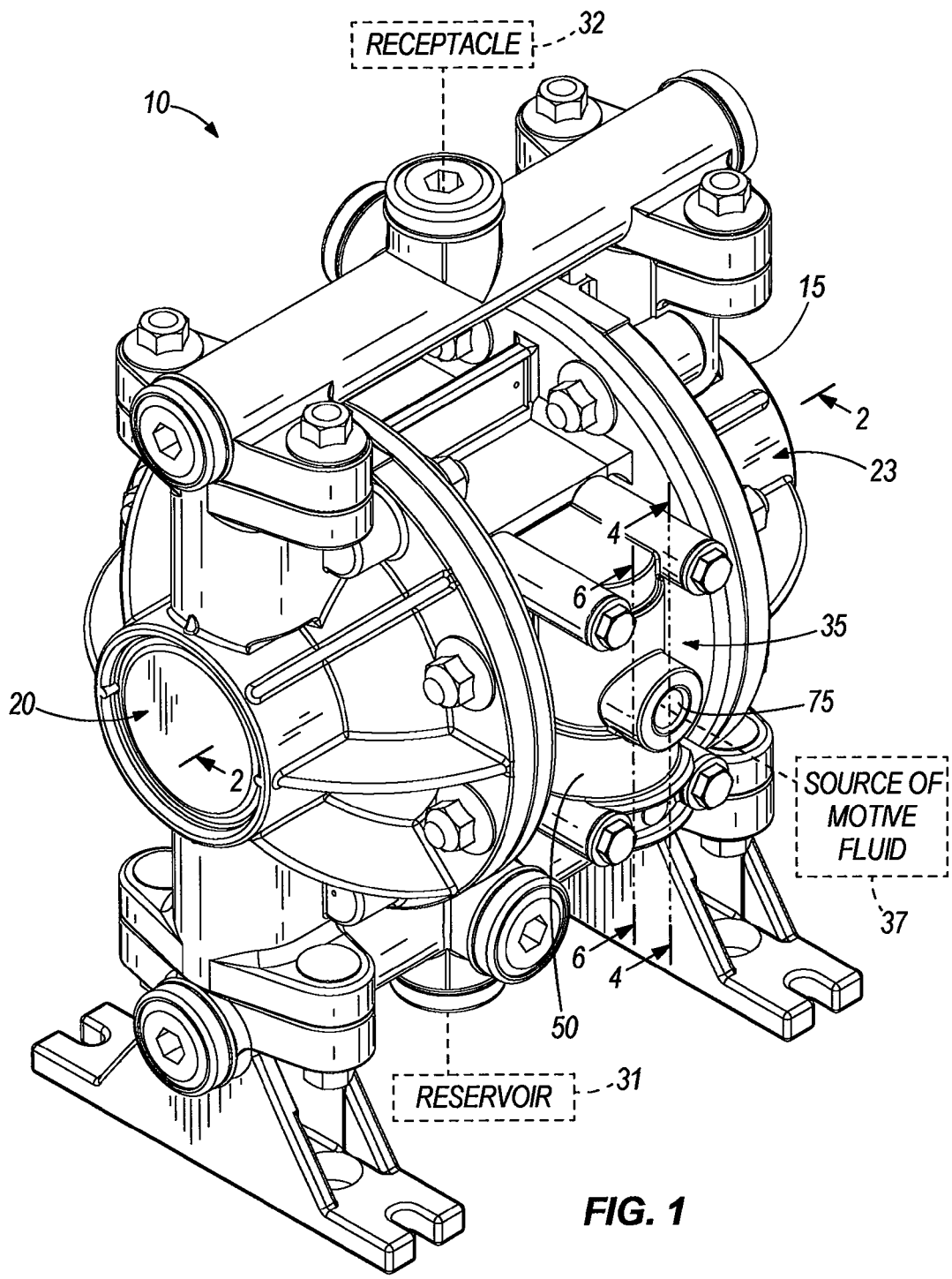
FIG. 1 is a perspective view of a pump including a valve assembly.
Figure 2:
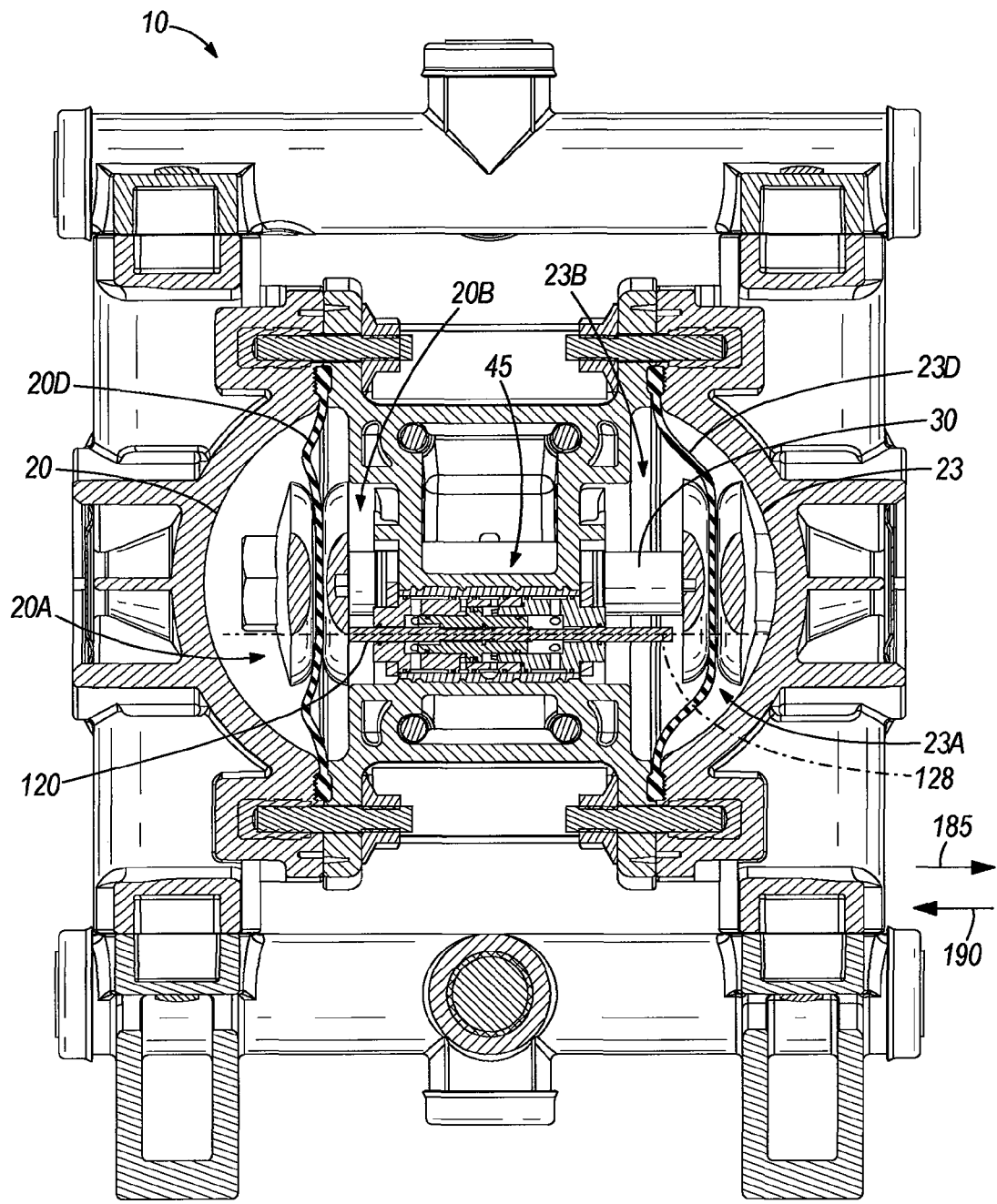
FIG. 2 is a cross-sectional view of the pump taken along line 2-2 in FIG. 1 and illustrating a pair of diaphragms of the pump actuated in a first direction.
Figure 3:
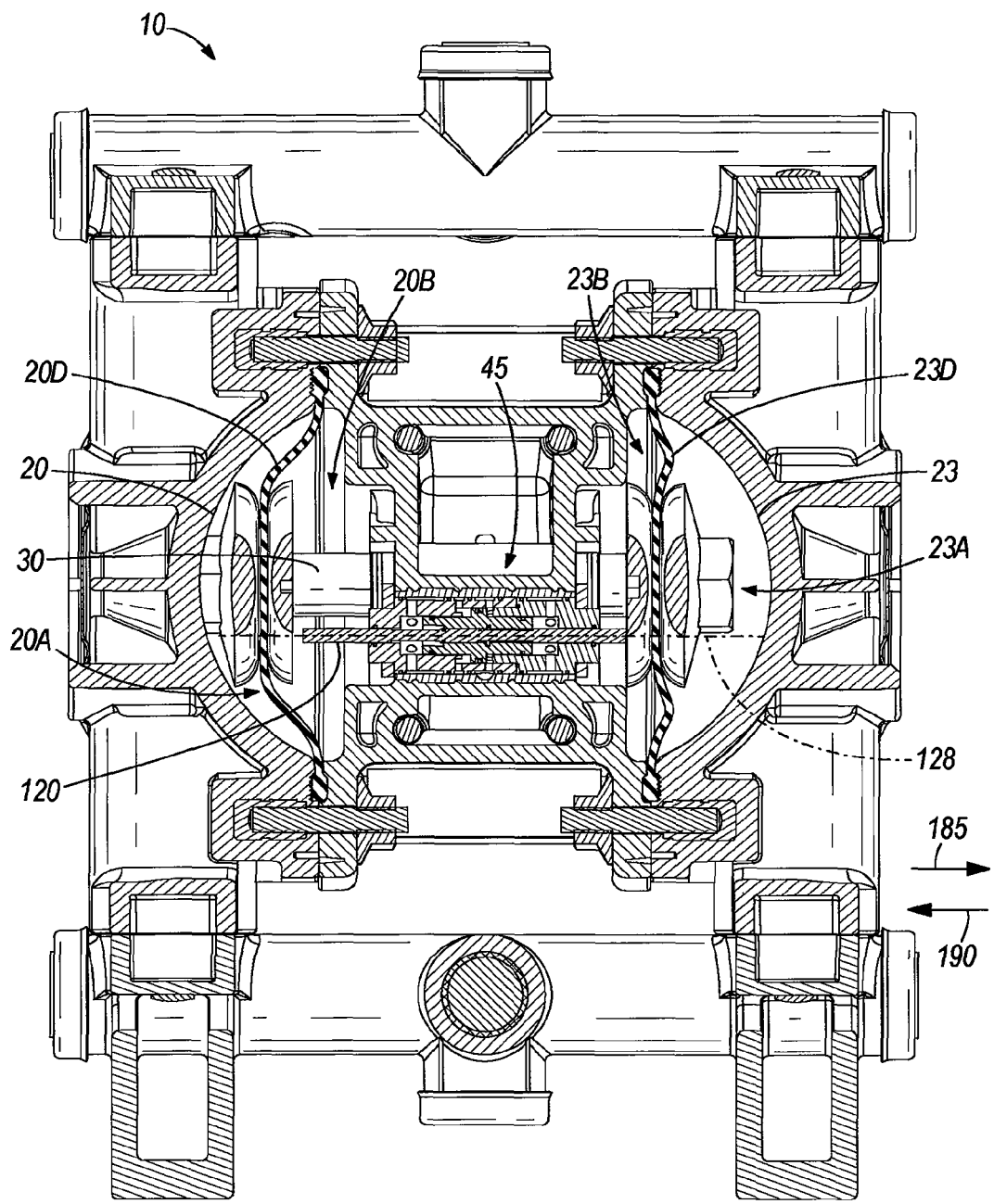
FIG. 3 is a cross-sectional view of the pump illustrating the pair of diaphragms actuated in a second direction.

FIGS. 1-3 illustrate a double diaphragm pump 10 that includes a housing 15 defining a first working chamber 20 and a second working chamber 23. A first member 20D is positioned within the first working chamber 20 and a second member 23D is positioned within the second working chamber 23. The first and second members 20D, 23D are a pair of diaphragms in the illustrated embodiment. With reference to FIGS. 2 and 3, a first side of the first member 20D partially defines a motive fluid chamber 20B and a second, opposite side of the first member 20D partially defines a pump chamber 20A, and a first side of the second member 23D partially defines a motive fluid chamber 23B and a second, opposite side of the second member 23D partially defines a pump chamber 23A.

The first and second diaphragms 20D, 23D are interconnected through a shaft 30 for synchronized reciprocating movement. The shaft 30 is connected to the diaphragms 20D, 23D with connectors, which for the purposes of this disclosure are deemed part of the diaphragms 20D, 23D. The pump chambers 20A, 23A alternatingly expand and contract to create respective low and high pressure in response to the reciprocating movement of the first and second diaphragms 20D, 23D. The pump chambers 20A, 23A communicate with a reservoir 31 containing the fluid to be pumped, and a receptacle or destination 32 for the fluid to be pumped. Check valve assemblies ensure that fluid to be pumped moves only from the reservoir 31 toward the receptacle 32.

Figure 4:
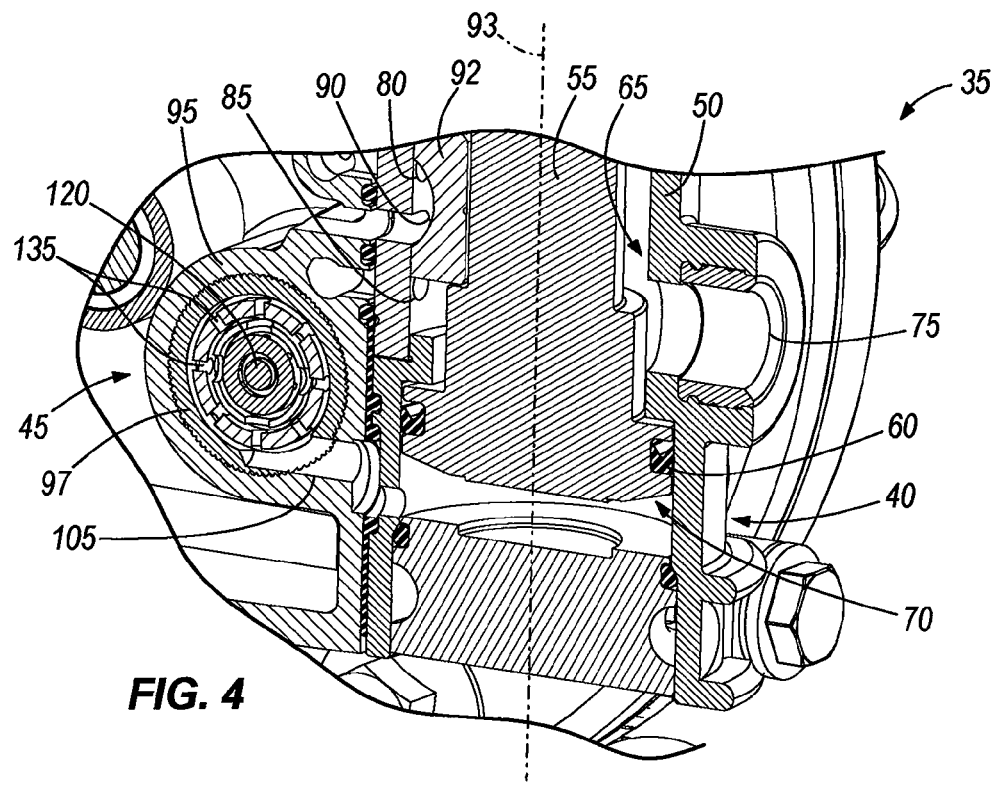
FIG. 4 is a cross-sectional view of the valve assembly of the pump taken along line 4-4 in FIG. 1 and illustrating a power valve of the valve assembly in a second position.
Figure 5:
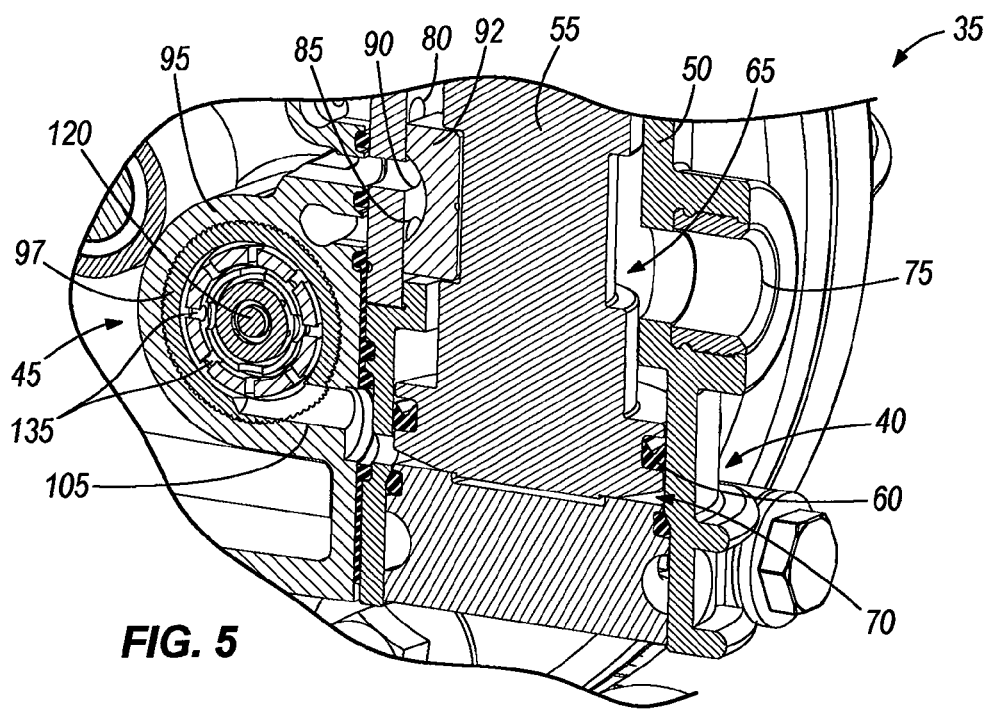
FIG. 5 is a cross-sectional view of the valve assembly illustrating the power valve in a first position.
Figure 6:
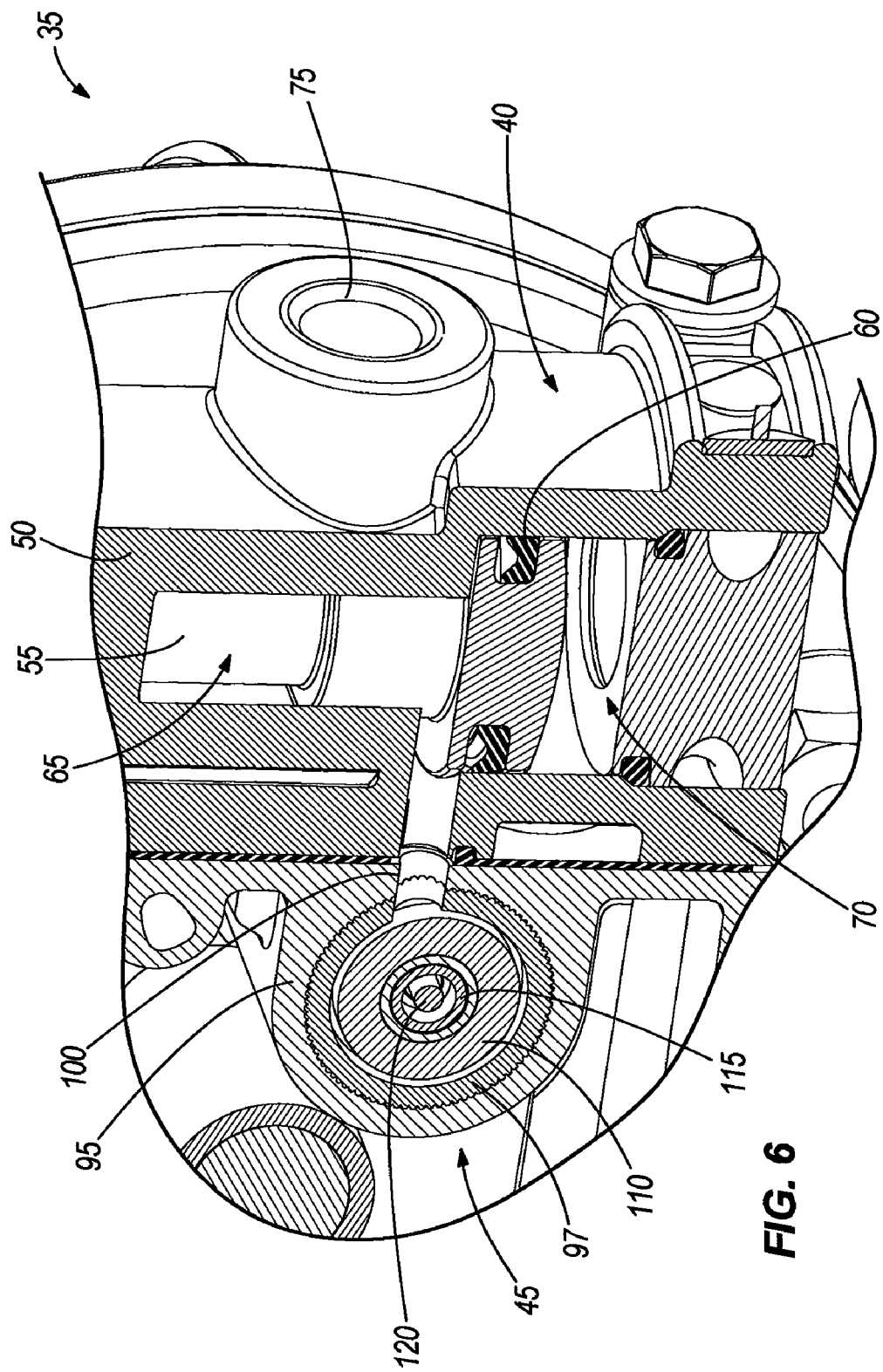
FIG. 6 is a cross-sectional view of the valve assembly taken along line 6-6 in FIG. 1.

The pump 10 includes a valve assembly 35 communicating with a source of motive fluid 37 (e.g., compressed air or hydraulic fluid). The valve assembly 35 includes a power valve 40 (FIGS. 4-6) and a pilot valve 45 (FIGS. 2-6). With reference to FIGS. 4-6, the power valve 40 includes a valve body 50 and a spool or shiftable member 55 positioned within the valve body 50. The spool 55 is a differential spool and reciprocates axially within the valve body 50 in response to the power valve 40 receiving and not receiving a pilot signal. A sealing member 60 forms an impermeable seal between the valve body 50 and the spool 55, partially defining and separating a supply chamber 65 and a pilot chamber 70 within the power valve 40.

As shown in FIGS. 4 and 5, a supply inlet port 75, first port 80, a second port 85 and an exhaust port 90 are formed in the valve body 50. In the illustrated embodiment, the first port 80 communicates with the motive fluid chamber 23B and the second port 85 communicates with the motive fluid chamber 20B, while the exhaust port 90 communicates with the atmosphere through an exhaust assembly or structure. Motive fluid from the source 37 is supplied through the supply inlet port 75 to the supply chamber 65 and raises the pressure in the supply chamber 65 around the spool 55. A D-shaped valve 92 is positioned in the supply chamber 65 and is captured in a groove in the spool 55, such that the D-shaped valve 92 and spool 55 move in unison within the supply chamber 65. As the spool 55 and D-shaped valve 92 move back and forth in the supply chamber 65, the D-shaped valve 92 alternatingly places one of the first and second ports 80, 85 in communication with the exhaust port 90, while at substantially the same time placing the other of the first and second ports 80, 85 in communication with the pressurized motive fluid in the supply chamber 65.

The pilot valve 45 alternates between an on condition or position and an off condition or position. When in the on condition, the pilot valve 45 places the pilot chamber 70 in communication with pressurized motive fluid. The supply of pressurized motive fluid to the pilot chamber 70 is referred to as the pilot signal. When in the off condition, the pilot valve 45 places the pilot chamber 70 in communication with the atmosphere. Thus, the pilot signal is "on" when the pilot valve 45 is in the on condition, and the pilot signal is "off" when the pilot valve 45 is in the off condition.

"Net surface area," as used herein, refers to the total surface area against which pressure bears in one direction, minus the total surface area against which the pressure bears in an opposite direction. When the pressure bears against substantially equal surface areas in both directions such that biasing forces in opposite directions substantially offset each other, the net surface area (and resulting net biasing force) is said to be zero.

The net surface area of the spool 55 within the supply chamber 65 giving rise to biasing forces toward the first position (i.e., downwardly toward the position in FIG. 5) is smaller than the net surface area of the spool 55 within the pilot chamber 70 giving rise to biasing forces toward the second position (i.e., upwardly toward the position in FIG. 4). Consequently, when the pilot signal is on (i.e., when the supply and pilot chambers 65, 70 are both exposed to the motive fluid and therefore pressurized at equal pressure), the axial biasing force applied on the pilot chamber 70 side exceeds the opposite axial biasing force applied on the supply chamber 65 side, and the spool 55 will shift axially into the second position. When the pilot signal is off, the pilot chamber 70 is exposed to atmospheric pressure while the supply chamber 65 continues to be exposed to motive fluid pressure. Consequently, when the pilot signal is off, the axial biasing force from the supply chamber 65 side exceeds the axial biasing force from the pilot chamber 70 side, and the spool 55 will shift into the position illustrated in FIG. 5 (referred to herein as the "first position").

When in the second position (FIG. 4), the spool 55 and D-shaped valve 92 permit or open communication between the supply chamber 65 and the second port 85, and resist or close communication between the supply chamber 65 and first port 80 while the D-shaped valve 92 places the first port 80 in communication with the exhaust port 90. When in the first position (FIG. 5), the spool 55 and D-shaped valve 92 permit or open communication between the supply chamber 65 and the first port 80, and resist or close communication between the supply chamber 65 and the second port 85 while the D-shaped valve 92 places the second port 85 in communication with the exhaust port 90. As the spool 55 shifts back and forth between the first and second positions, the motive fluid chambers 23B, 20B are alternately placed in communication with motive fluid from the supply chamber 65 and with the atmosphere, such that as one motive fluid chamber 23B or 20B fills up or expands with motive fluid, the other motive fluid chamber 23B, 20B deflates or contracts and is exhausted. This alternating expansion and contraction of the motive fluid chambers 23B, 20B drives alternating expansion and contraction of the pump chambers 20A, 23A to pump the fluid to be pumped. As mentioned above, the motive fluid chambers in other applications and embodiments may be included in air motors, piston pumps, or other applications, and the present invention should not be regarded as limited to double diaphragm pump applications.

As shown in FIGS. 4-6, the pilot valve 45 includes a housing 95 coupled to the valve body 50 of the power valve 40. A sleeve 97 is press-fit or otherwise provided within the housing 95. With reference to FIG. 6, a first passageway 100 formed in the housing 95 and sleeve 97 constantly communicates motive fluid from the supply chamber 65 to the pilot valve 45. With reference to FIGS. 4 and 5, a second passageway 105 communicates through the housing 95 and sleeve 97 between the pilot valve 45 and the pilot chamber 70.

Figure 7:
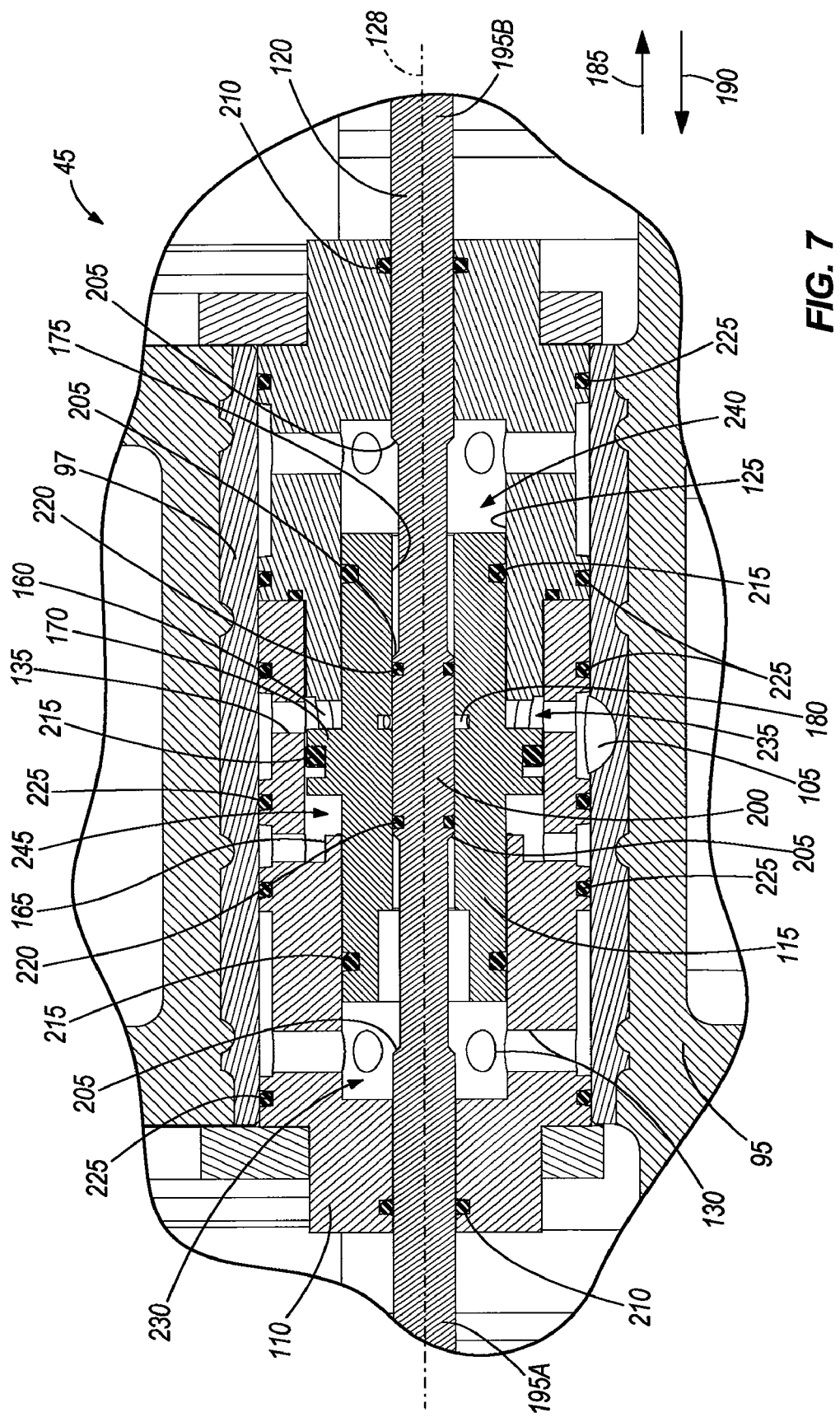
FIG. 7 is a cross-sectional view of a pilot valve of the valve assembly moving into an on condition.
Figure 8:
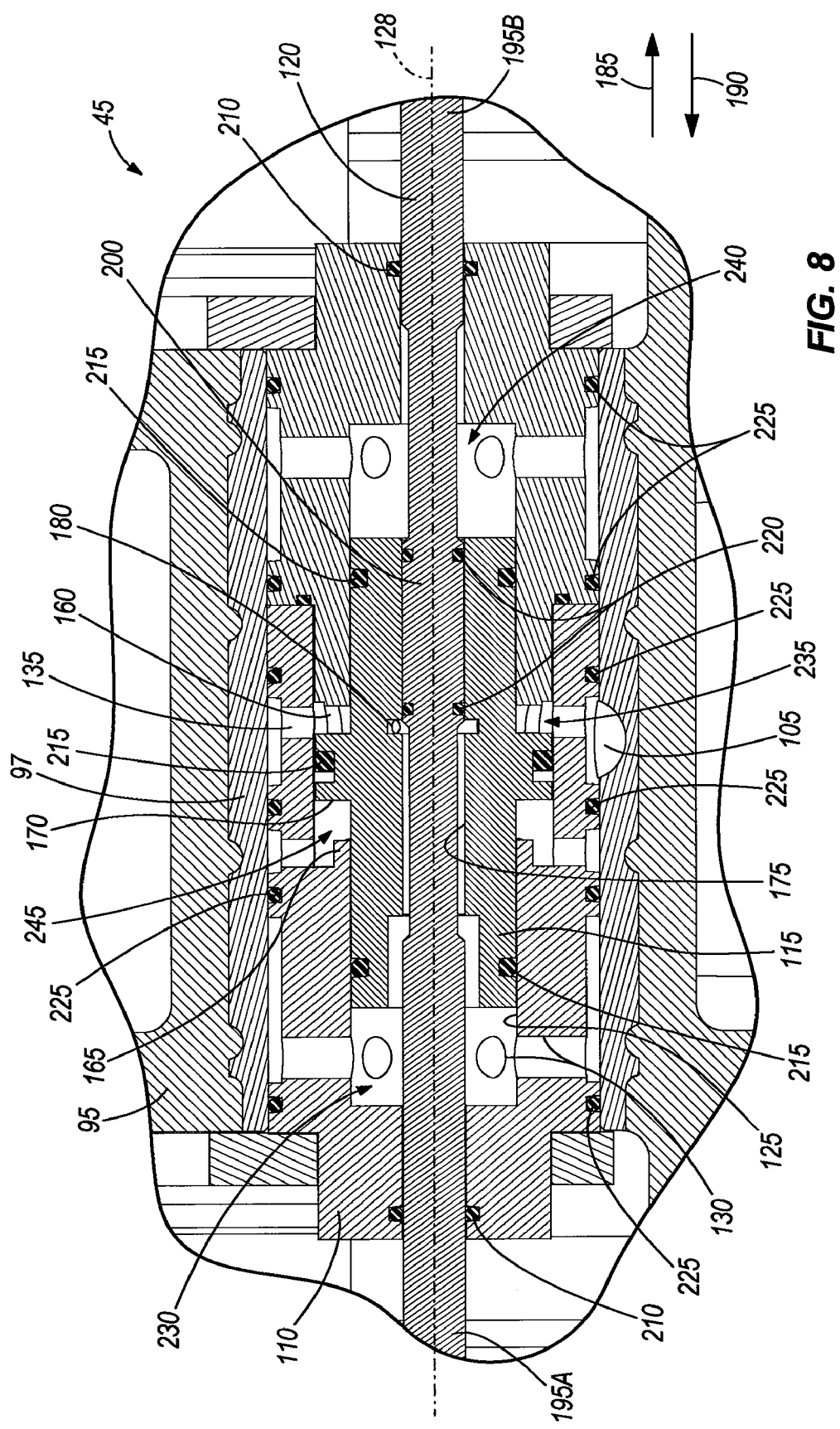
FIG. 8 is a cross-sectional view of the pilot valve moving further into the on condition.

As shown in FIGS. 7-12, the pilot valve 45 also includes a pilot valve body 110, a pilot piston 115 positioned within the valve body 110, and a trip rod, pilot rod, or pilot actuator 120 extending through the piston 115. The piston 115 is positioned in a bore 125 formed in the valve body 110 and is movable along a central axis 128 of the valve body 110. The valve body 110 is within the bore of the sleeve 97. With reference to FIG. 7, the valve body 110 includes the following radially-extending ports that communicate with the bore 125: an inlet port 130, an outlet port 135, a first exhaust port 140 and a second exhaust port 145. In the illustrated embodiment, each port is defined by multiple apertures extending through the valve body 110.

The inlet port 130 is at one end of the valve body 110, and the first exhaust port 140 is at the opposite end. The outlet port 135 is positioned approximately equidistant between the inlet port 130 and the first exhaust port 140, and the second exhaust port 145 is positioned between the inlet port 130 and the outlet port 135. In other embodiments, each port may be positioned in alternate configurations, provided that the ports are able to communicate motive fluid as discussed herein.

With continued reference to FIG. 7, the inlet port 130 communicates with the first passageway 100 (FIG. 6), the outlet port 135 communicates with the second passageway 105 (FIGS. 4 and 5), and the first and second exhaust ports 140, 145 communicate with the exhaust assembly of the pump 10 or directly with the atmosphere to vent or exhaust motive fluid from the pilot valve 45. The basic operation of the pilot valve 45 is to alternatingly place the outlet port 135 in communication with the inlet port 130 and the first exhaust port 140 to turn the pilot signal on and off, respectively.

In the illustrated embodiment, the valve body 110 is made of two parts that are sealably coupled to one another around the piston 115 to facilitate assembly. The trip rod 120 extends through and is supported for reciprocating movement by the ends of the valve body 110. The two parts of the valve body 110 include a first stop 160 and a second stop 165. In other embodiments, the valve body 110 may be assembled using fewer or more than two parts.

The piston 115 is cylindrical-shaped and includes a flange 170 positioned between the stops 160, 165 of the valve body 110. An orifice or passageway 175 extends through the piston 115 along the central axis 128 of the valve body 110. The orifice 175 has a uniform cylindrical shape such that the trip rod 120 is able to reciprocate freely therein. An annular gland 180 extends through the piston 115 and communicates between the orifice 175 and an exterior surface of the piston 115 near the outlet port 135. The annular gland 180 is defined by apertures radially extending through the piston 115.

The piston 115 is able to reciprocate in a first direction 185 and a second direction 190 along the central axis 128 of the valve body 110. Specifically, the piston 115 reciprocates between abutment with the first stop 160, illustrated in FIGS. 7, 8, and 12, and abutment with the second stop 165, illustrated in FIGS. 10-12. The first stop 160 prevents the flange 170 of the piston 115 from entirely covering the outlet port 135. The second stop 165 prevents the flange 170 from entirely covering the second exhaust port 145. By maintaining at least a portion of the outlet and second exhaust ports 135, 145 clear of the flange 170, fluid is able to enter and exit through the outlet and second exhaust ports 135, 145 even when the piston 115 is at the ends of its stroke.

As shown in FIGS. 7-12, the trip rod 120 includes a first end portion 195A, a second end portion 195B and a central portion 200. The trip rod 120 is made as a single part, although in other embodiments, the trip rod 120 may be made of more than one part. In the illustrated embodiment, the trip rod 120 includes chamfered surfaces 205 (FIG. 7) formed between the central portion 200 and the end portions 195A, 195B. The trip rod 120 is machined to precise dimensions such that the area of the trip rod surfaces that face in one axial direction is substantially equal to the area of the trip rod surfaces that face in the opposite axial direction (i.e., the net surface area of the rod 120 for the purpose biasing the rod in the first or second directions 185, 190 is zero).

As shown in FIGS. 2 and 3, the trip rod 120 is separate from and movable with respect to the first and second diaphragms 20D, 23D of the pump 10 in the particular embodiment illustrated. The first and second diaphragms 20D, 23D alternatingly engage and mechanically actuate the end portions 195A, 195B (FIGS. 7-12) of the trip rod 120 to cause reciprocating motion of the trip rod 120 in the first and second directions 185, 190 with respect to the piston 115. The trip rod 120 is able to travel farther in the first and second directions 185, 190 than the first and second diaphragms 20D, 23D. For example, the trip rod 120 may continue to slide in the first direction 185 in response to the momentum of the first diaphragm 20D transmitted to the trip rod 120.

With reference to FIGS. 7-12, a first pair of sealing members 210 are positioned in grooves in the ends of the valve body 110 and maintain an impermeable seal between the trip rod 120 and the valve body 110 so as to resist the escape of motive fluid through the ends of the valve body 110. Second sealing members 215 (e.g., three sealing members in the illustrated embodiment) are positioned in grooves formed in the piston 115, and form an impermeable seal between the piston 115 and the valve body 110. Third sealing members 220 (e.g., two sealing members in the illustrated embodiment) are positioned in grooves formed in the central portion 200, and form an impermeable seal between the trip rod 120 and the piston 115. The third sealing members 220 are axially spaced apart from one another on the trip rod 120. Fourth sealing members 225 (e.g., six sealing members in the illustrated embodiment) are positioned in grooves formed in the valve body 110, and form an impermeable seal between the valve body 110 and the sleeve 97.

In the illustrated embodiment, the first, second, third and fourth sealing members 210, 215, 220, 225 are O-rings. In other embodiments, the sealing members may be other gaskets that are known in the art for generating impermeable seals between moving components.

With continued reference to FIGS. 7-12, the second and third sealing members 215, 220 cooperate with one another to divide the bore 125 of the valve body 110 into an inlet chamber 230, an outlet chamber 235, a first exhaust chamber 240 and a second exhaust chamber 245. The fourth sealing members 225 maintain separation of the motive fluid entering and exiting the respective chambers.

The inlet chamber 230 continuously communicates (i.e., openly communicates) with the supply chamber 65 of the power valve 40. The supply chamber 65 provides a constant supply of motive fluid to the inlet chamber 230. Motive fluid within the inlet chamber 230 applies a constant pressure and biasing force on the piston 115 in the first direction 185. Because of the chamfered surfaces 205 of the rod 120 have substantially identical surface area, however, there is no net axial biasing force on the rod 120 arising from the motive fluid.

The outlet chamber 235 alternatingly places the pilot chamber 70 of the power valve 40 in communication with the inlet chamber 230 and the first exhaust chamber 240. The first and second exhaust chambers 240, 245 maintain constant communication with the exhaust assembly or directly with the atmosphere. As the trip rod 120 reciprocates with respect to the piston 115, the third sealing members 220 open and close communication between the inlet chamber 230 and the outlet chamber 235, and between the outlet chamber 235 and the first exhaust chamber 240.

Fluid within the second exhaust chamber 245 is always separate from fluid in any of the other chambers 230, 235, 240. The second exhaust port 145 and second exhaust chamber 245 reduce resistance to piston 115 movement. As the piston 115 travels in the first direction 185, atmospheric air is drawn into the second exhaust chamber 245 through the second exhaust port 145. The return travel of the piston 115 in the second direction 190 generates a positive pressure within the second exhaust chamber 245 and exhausts fluid from the second exhaust chamber 245, through the second exhaust port 145, and to the atmosphere.

The operation of the valve assembly 35 will now be described with reference to FIGS. 7-12. The following description will explain a complete cycle of operation of the valve assembly 35, starting with the pilot valve 45 in the off condition illustrated in FIG. 12.

Figure 12:
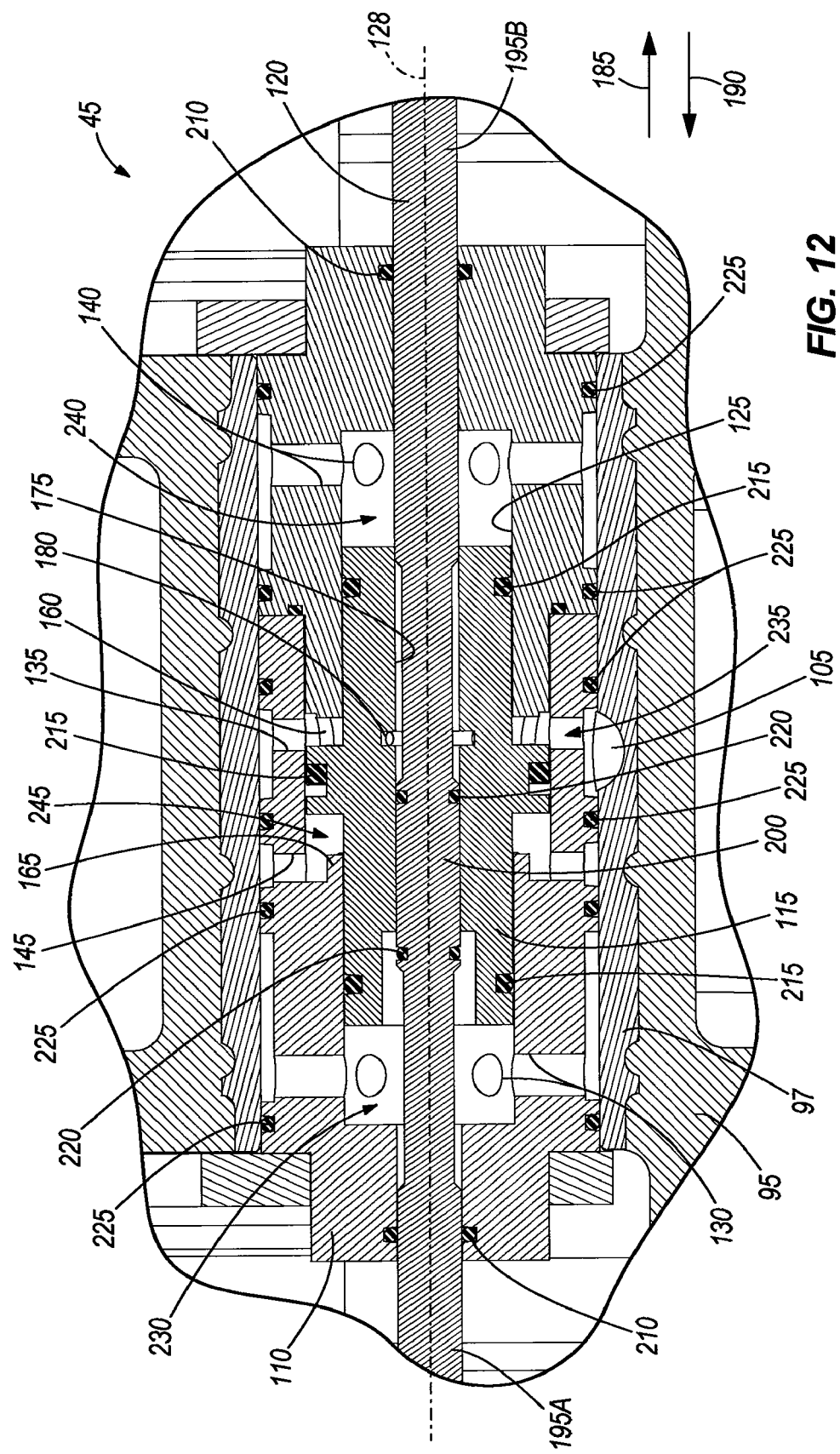
FIG. 12 is a cross-sectional view of the pilot valve in the off condition.
Figure 13:
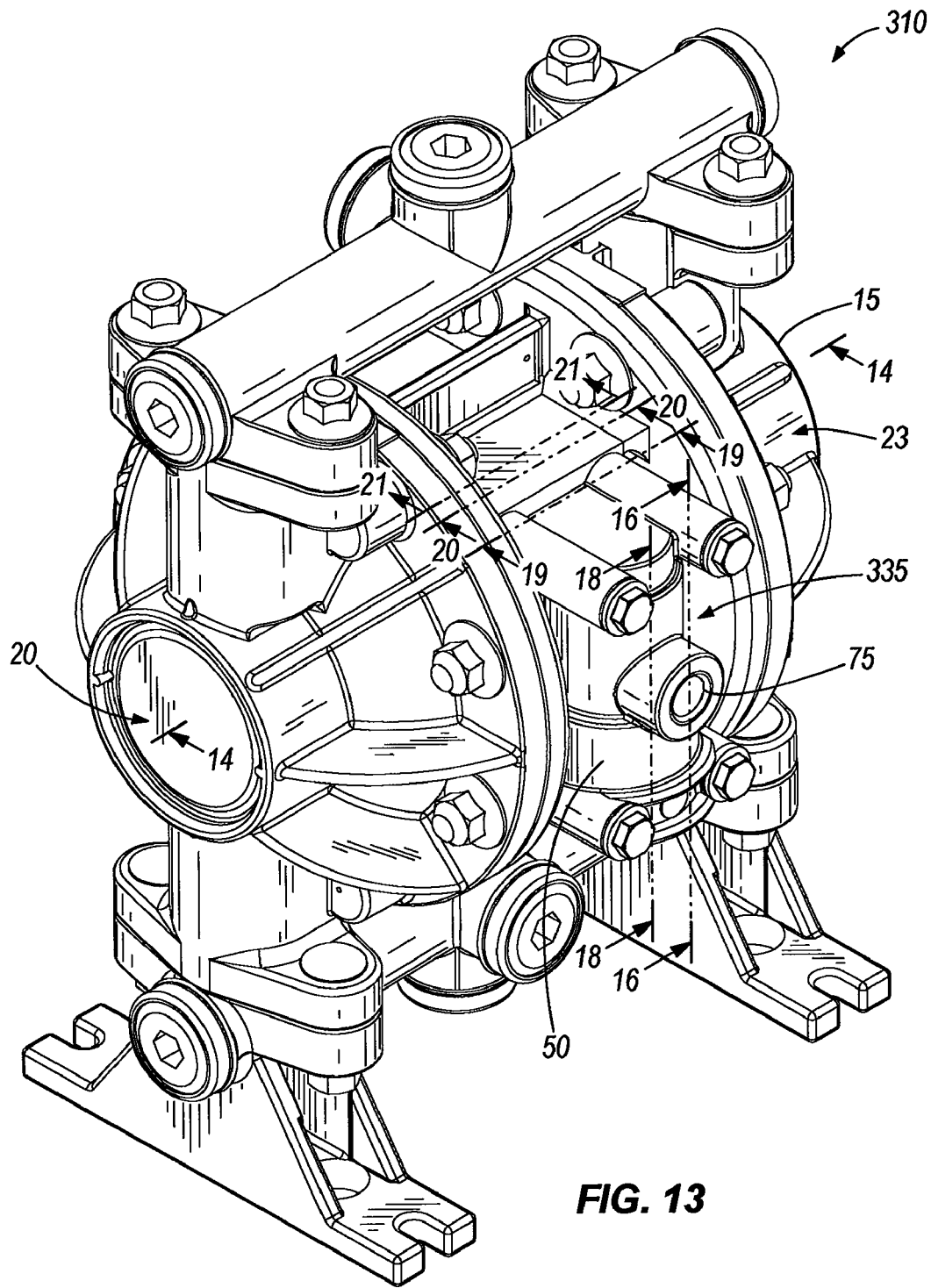
FIG. 13 is a perspective view of a pump including an alternative embodiment of the valve assembly of the present invention.

In FIG. 12, the piston 115 abuts the first stop 160 and the trip rod 120 is in the off position, so the pilot valve 45 is in the off condition. The inlet chamber 230 is, as always, filled with elevated pressure motive fluid, and the outlet chamber 235 is at atmospheric pressure. The motive fluid pressure acting on the inlet chamber 230 side of the piston 115 gives rise to a greater force in the first direction 185 than the force in the second direction 190 arising from atmospheric pressure acting on the piston 115 from the outlet chamber 235 side. As a result, the piston 115 is biased into abutment with the first stop 160 when the pilot valve is in the off condition. With the pilot valve 45 in the off condition, the pilot chamber 70 of the power valve 40 communicates with the atmosphere through the second passageway 105 (FIG. 5), outlet port 135, outlet chamber 235, annular gland 180, orifice 175, first exhaust chamber 240, and first exhaust port 140.

With reference to FIG. 5, because the pilot chamber 70 receives no pilot signal (i.e., the pilot chamber 70 is at atmospheric pressure), the pressure in the supply chamber 65 moves the spool 55 and D-shaped valve 92 into the first position. With the spool 55 and D-shaped valve 92 in the first position, motive fluid in the supply chamber 65 flows through the first port 80 into the motive fluid chamber 23B, while the D-shaped valve 92 places the second port 85 in communication with the exhaust assembly through the exhaust port 90, such that motive fluid is exhausted from the motive fluid chamber 20B.

In the illustrated embodiment, placing the motive fluid chamber 23B in communication with motive fluid and placing the motive fluid chamber 20B in communication with the atmosphere will cause the diaphragms 20D, 23D and shaft 30 to shift in the first direction 185 (i.e., right as viewed in FIGS. 2 and 3, into the position illustrated in FIG. 2). Such movement causes the diaphragm 20D to push the trip rod 120 in the first direction 185. In other embodiments in which the motive fluid chambers 20B, 23B are not part of a double diaphragm pump, another physical force may be used to push the trip rod in the first direction 185.

The pilot valve 45 is shifted from the off condition to the on condition in three steps or phases. First, with reference to FIG. 7, as the trip rod 120 shifts in the first direction 185 with respect to the piston 115, the nearest third sealing member 220 passes across the annular gland 180, which isolates the outlet chamber 235 from the inlet chamber 230 and the first exhaust chamber 240. Second, with reference to FIG. 8, continued movement of the trip rod 120 in the first direction 185 causes the other third sealing member 220 to pass across the annular gland 180 to place the inlet chamber 230 and outlet chamber 235 in communication with each other. As a result, the pilot signal is supplied to the pilot chamber 70 from the source of motive fluid through the inlet port 75, supply chamber 65, first passageway 100, inlet port 130, inlet chamber 230, orifice 175, annular gland 180, outlet chamber 235, outlet port 135, and second passageway 105 (i.e., the pilot signal is turned on).

Figure 9:
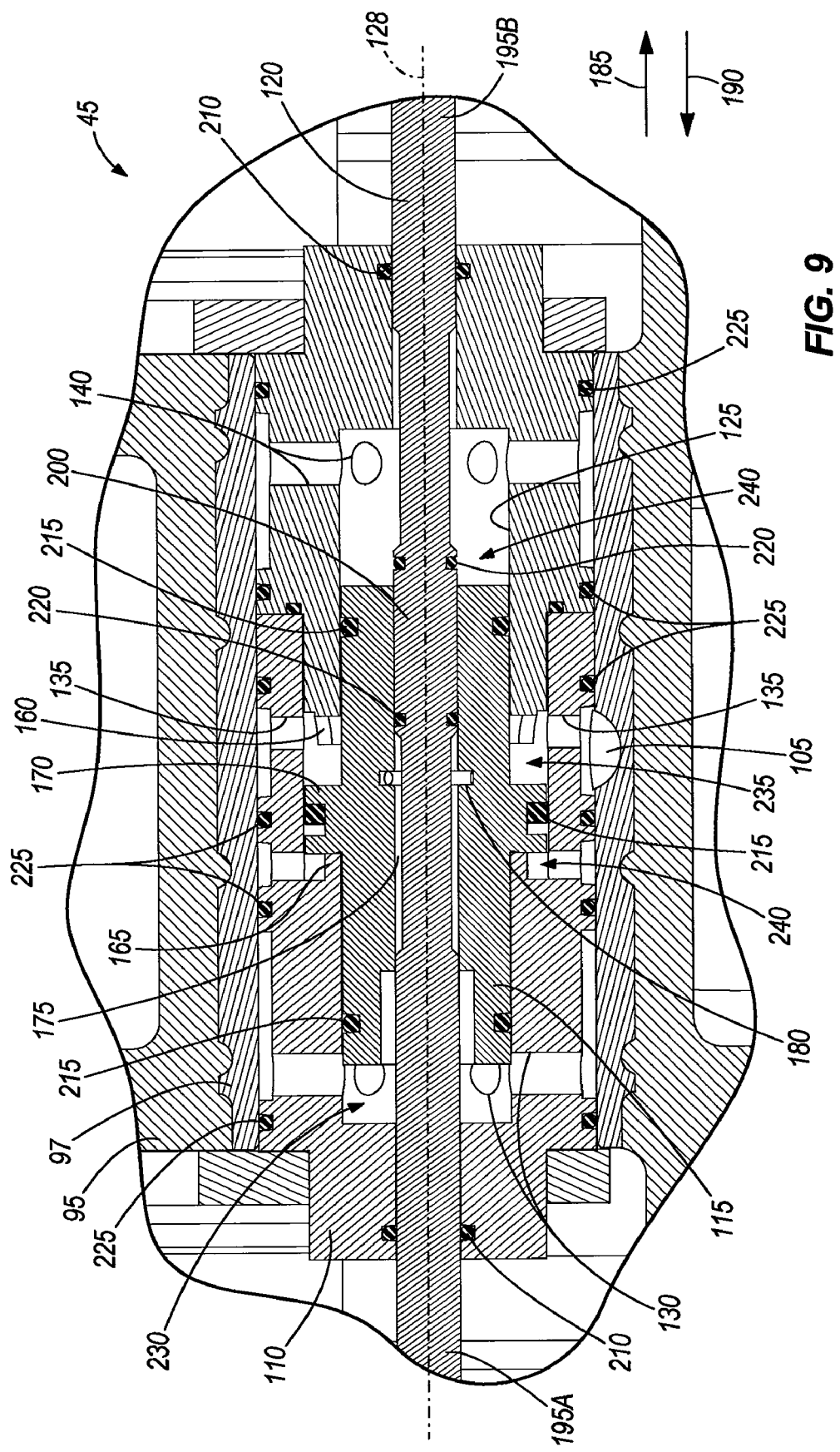
FIG. 9 is a cross-sectional view of the pilot valve in the on condition.

Third, motive fluid within the outlet chamber 235 of the pilot valve 45 applies a pressure on the flange 170 of the piston 115. With the pressure in the inlet chamber 230 and outlet chamber 235 being equal, the piston 115 is shifted in the second direction 190 due to the flange 170 having a larger net surface area than the net surface area of the end of the piston 115 facing the inlet chamber 230. Thus, the piston 115 is shifted in the second direction 190 until the flange 170 abuts the second stop 165 of the valve body 110, as illustrated in FIG. 9, and the pilot valve is now in the on condition.

The movement of the piston 115 in the second direction 190 increases the axial distance between the annular gland 180 and the central portion 200 of the trip rod 120. In some cases, vibrations produced during operation of the pump 10 can cause the trip rod 120 to shift or float slightly in the first or second direction 185, 190. By increasing the axial distance between the annular gland 180 and the central portion 200, the trip rod 120 is able to drift slightly in the second direction 190 without undesirably closing communication between the inlet chamber 230 and the outlet chamber 235. Fluid within the second exhaust chamber 245 is exhausted to the atmosphere in response to the movement of the piston 115 in the second direction 190. In other embodiments, the piston 115 does not reciprocate with respect to the valve body 110. In still other embodiments, the valve body 110 and the piston 115 may be coupled together or formed as a single part.

Referring now to FIG. 4, at the same time that the piston 115 is being shifted in the second direction 190 as discussed above, the pilot signal actuates the spool 55 and D-shaped valve 92 of the power valve 40 from the first position illustrated in FIG. 5 to the second position illustrated in FIG. 4. Although the motive fluid in the supply chamber 65 continues to give rise to a biasing force on the spool 55 toward the first position, the pilot signal (which is at the same pressure as the motive fluid pressure in the supply chamber 65) gives rise to a larger biasing force on the spool 55 toward the second position, owing to the net surface area of the spool 55 facing the pilot chamber 70 being larger than the net surface area of the spool 55 facing the supply chamber 65.

With the spool 55 and D-shaped valve 92 in the second position, motive fluid in the supply chamber 65 flows through the second port 85 into the motive fluid chamber 20B, while the D-shaped valve 92 places the first port 80 in communication with the exhaust assembly through the exhaust port 90, such that motive fluid is exhausted from the motive fluid chamber 23B. In response, the first and second diaphragms 20D, 23D and the shaft 30 shift in the second direction 190. Shifting in the second direction 190 causes the second diaphragm 23D to contact the second end portion 195B of the trip rod 120, and shift or mechanically actuate the trip rod 120 in the second direction 190.

Figure 10:
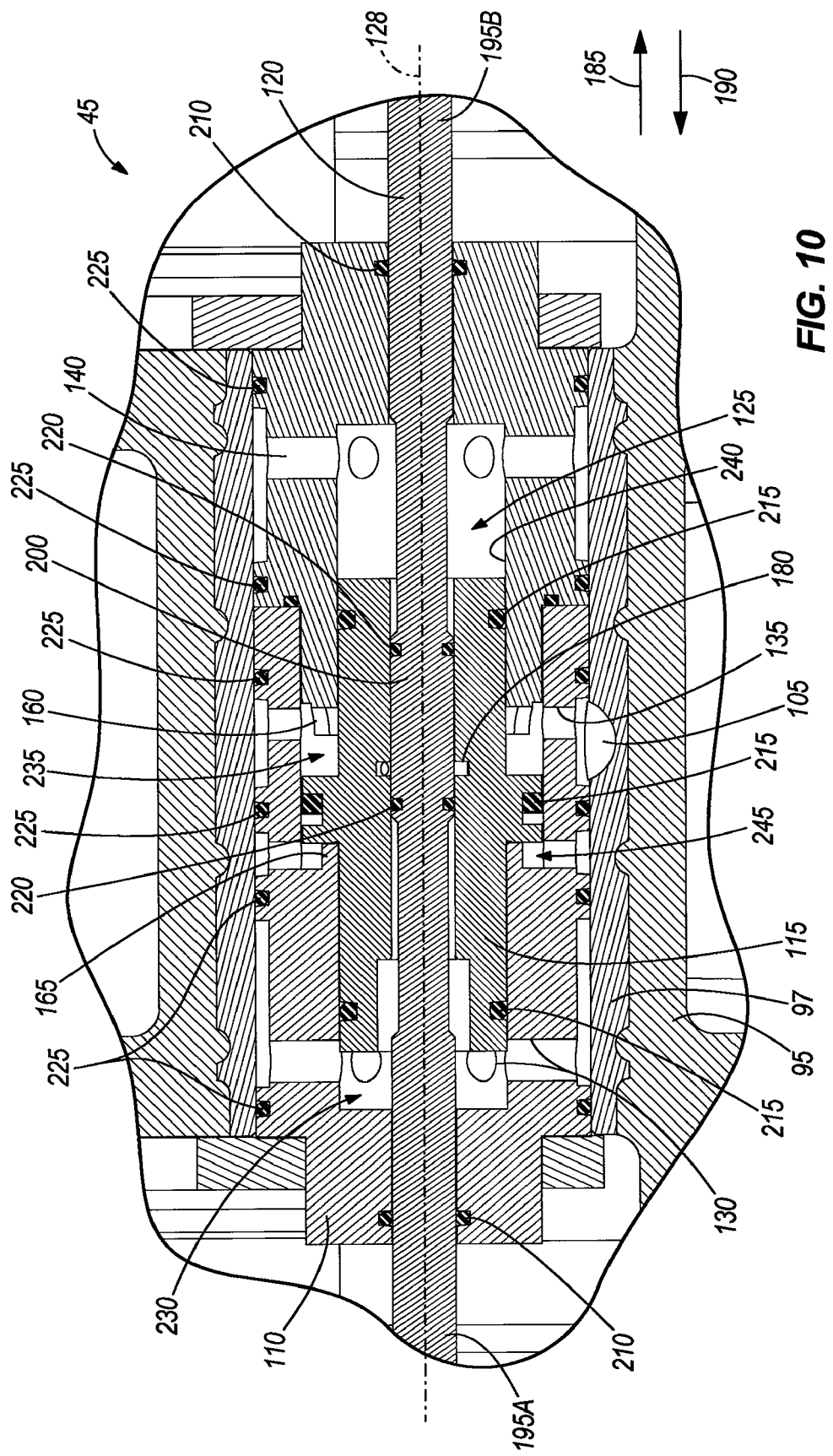
FIG. 10 is a cross-sectional view of the pilot valve moving into an off condition.
Figure 11:
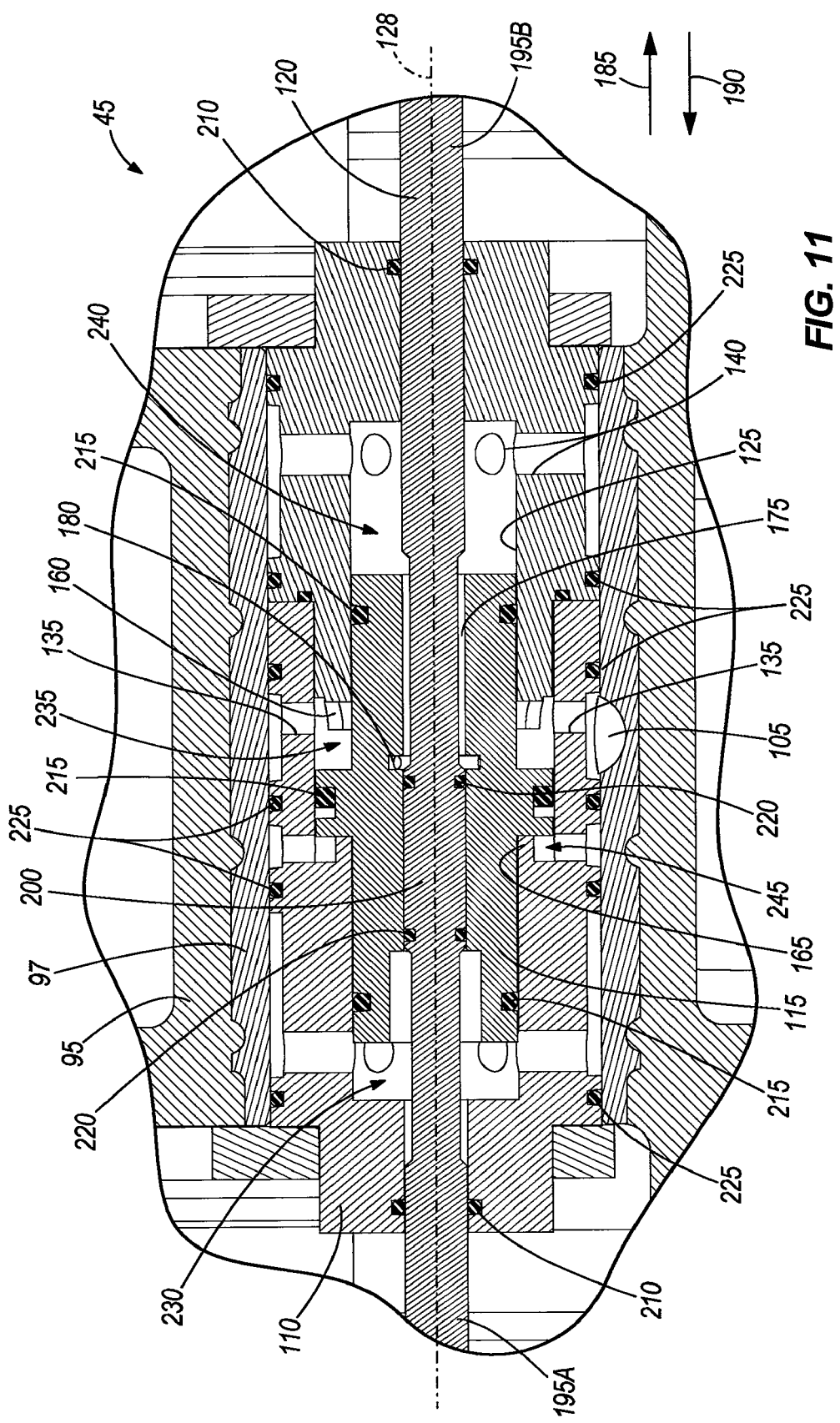
FIG. 11 is a cross-sectional view of the pilot valve moving further into the off condition.

With reference to FIGS. 10-12, the pilot valve 45 is shifted from the on condition to the off condition in three steps or phases. First, with reference to FIG. 10, as the central portion 200 of the trip rod 120 travels in the second direction 190, one of the third sealing members 220 slides past the annular gland 180. The two sealing members 220 are positioned on opposite axial sides of the annular gland 180, thus closing communication between the outlet chamber 235 and either of the inlet chamber 230 and first exhaust chamber 240. Second, with reference to FIG. 11, the trip rod 120 continues to shift in the second direction 190 as a result of the continued pressurization of the motive fluid chamber 20B and resulting movement of the diaphragms 20D, 23D in the second direction 190. The second of the third sealing members 220 on the central portion 200 shifts past the annular gland 180 in the second direction 190. As a result, the trip rod 120 opens communication between the outlet chamber 235 and the first exhaust chamber 240 (i.e., the pilot signal is turned off). Consequently, the pilot chamber 70 is again placed in communication with the atmosphere through the second passageway 105, outlet port 135, outlet chamber 235, annular gland 180, orifice 175, first exhaust chamber 240, and first exhaust port 140.

Third, because the outlet chamber 235 is now at atmospheric pressure, the biasing force on the piston 115 arising from motive fluid the inlet chamber 230 actuates the piston 115 in the first direction 185 until the flange 170 abuts the first stop 160 of the valve body 110 (FIG. 12), and the pilot valve 45 is now in the off position again. As the piston 115 moves toward the first stop 160, the second exhaust chamber 245 is maintained at atmospheric pressure by air drawn into the second exhaust chamber 245 through the second exhaust port 145. Consequently, no substantial vacuum develops in the second exhaust chamber 245 that would significantly resist movement of the piston 115 in the first direction 185. The movement of the piston 115 in the first direction 185 increases the axial distance between the annular gland 180 and the central portion 200 of the trip rod 120 to reduce the likelihood of the trip rod 120 rebounding or vibrating in the first direction 185 far enough to move one of the seals 220 past the annular gland 180. At the same time the piston 115 is being biased in the first direction 185, the spool 55 is biased into the first position (FIG. 5) due to the pilot chamber 70 being at atmospheric pressure while the supply chamber 65 is pressurized by motive fluid. As discussed above, when the spool 55 is in the first position, the motive fluid chamber 23B receives motive fluid from the supply chamber 65 through the first port 80 and the motive fluid chamber 20B is vented to the atmosphere through the second port 85, D-shaped valve 92, and exhaust port 90.

Because the net surface area of the pilot rod 120 is substantially zero, there is substantially no axial biasing force on the pilot rod 120 as a result of the motive fluid in the pilot valve 45. As a result, shifting the pilot valve between on and off conditions is resisted only by the sliding friction of the rod 120 in the seals 210 and the seals 220 sliding along the orifice 175, which is very small resistance. Furthermore and referencing FIGS. 7 and 10, the axial distance between the two sealing members 220 in the central portion 200 reduces the likelihood of the valve assembly 35 stalling. In particular, the central portion 200 with the seals 220 prevents direct communication between the inlet chamber 230 and the first exhaust chamber 240 though the orifice 175 as the trip rod 120 shifts axially with respect to the piston 115.

FIGS. 13-24 illustrate a pump 310 including a valve arrangement 335 according to another embodiment of the invention. The pump 310 is similar to the pump 10 shown in FIGS. 1-3; therefore, like structure will be identified by the same reference numerals.

Figure 14:
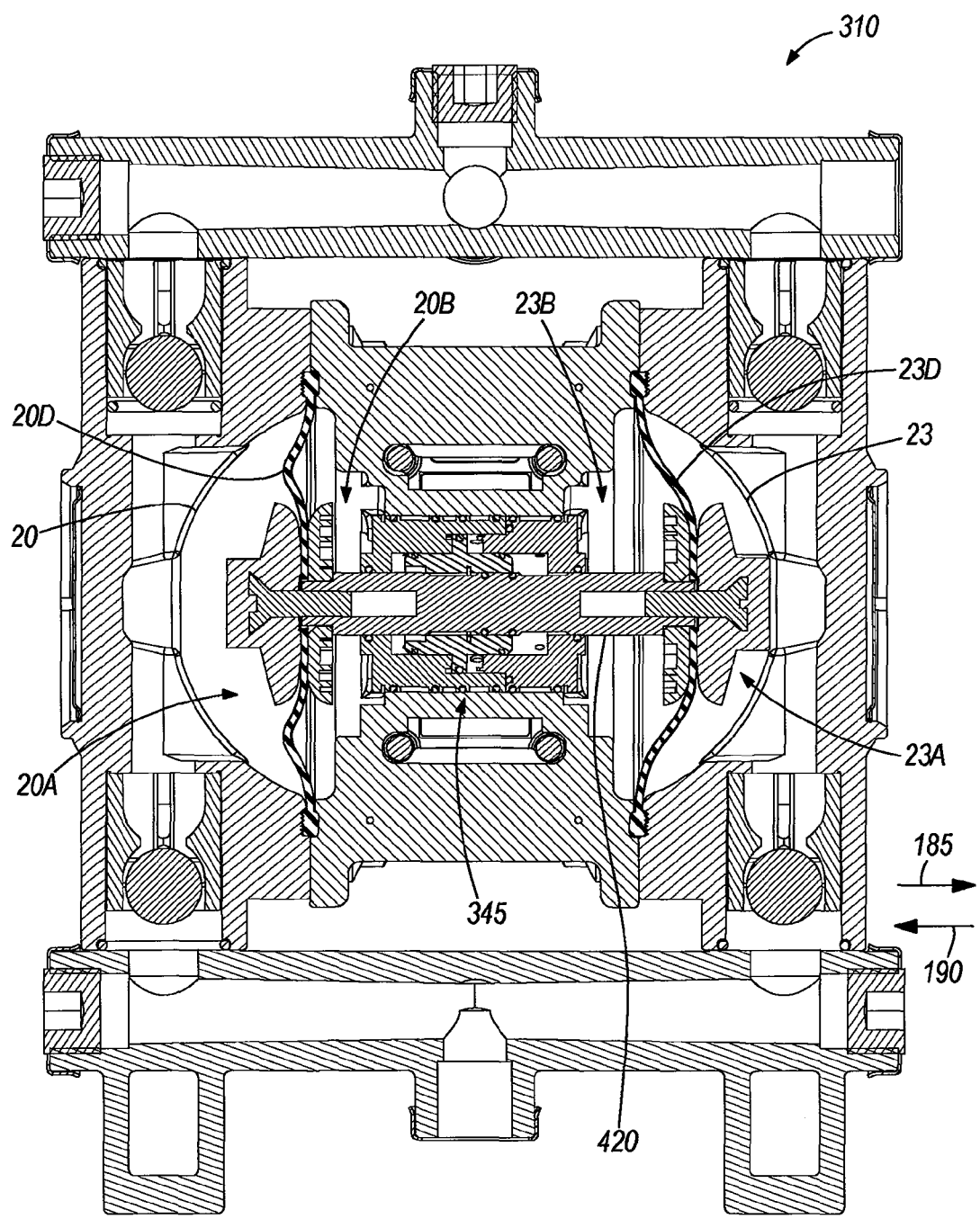
FIG. 14 is a cross-sectional view of the pump taken along line 14-14 in FIG. 13 and illustrating a pair of diaphragms of the pump actuated in a first direction.
Figure 15:
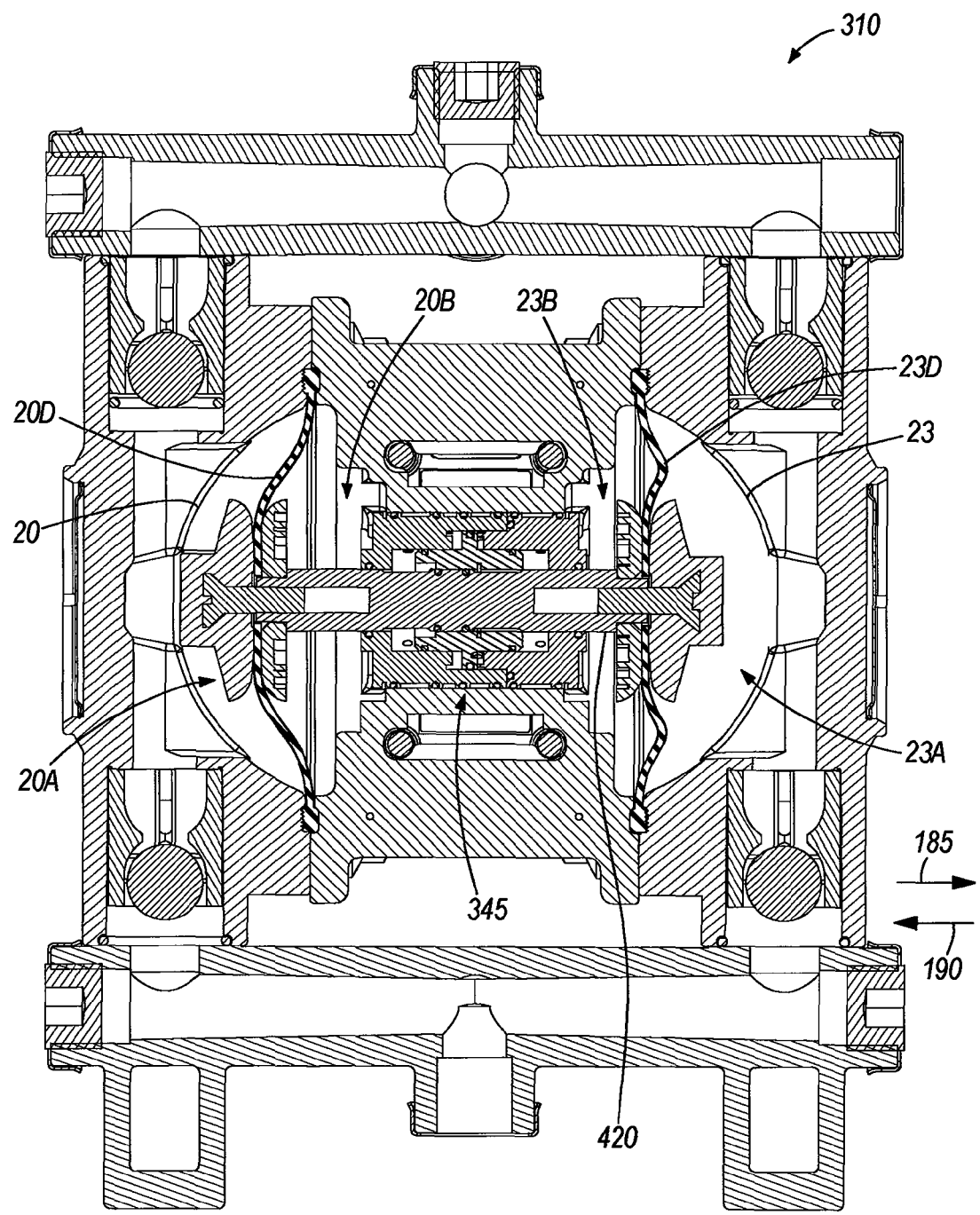
FIG. 15 is a cross-sectional view of the pump illustrating the pair of diaphragms of the pump actuated in a second direction.
Figure 16:
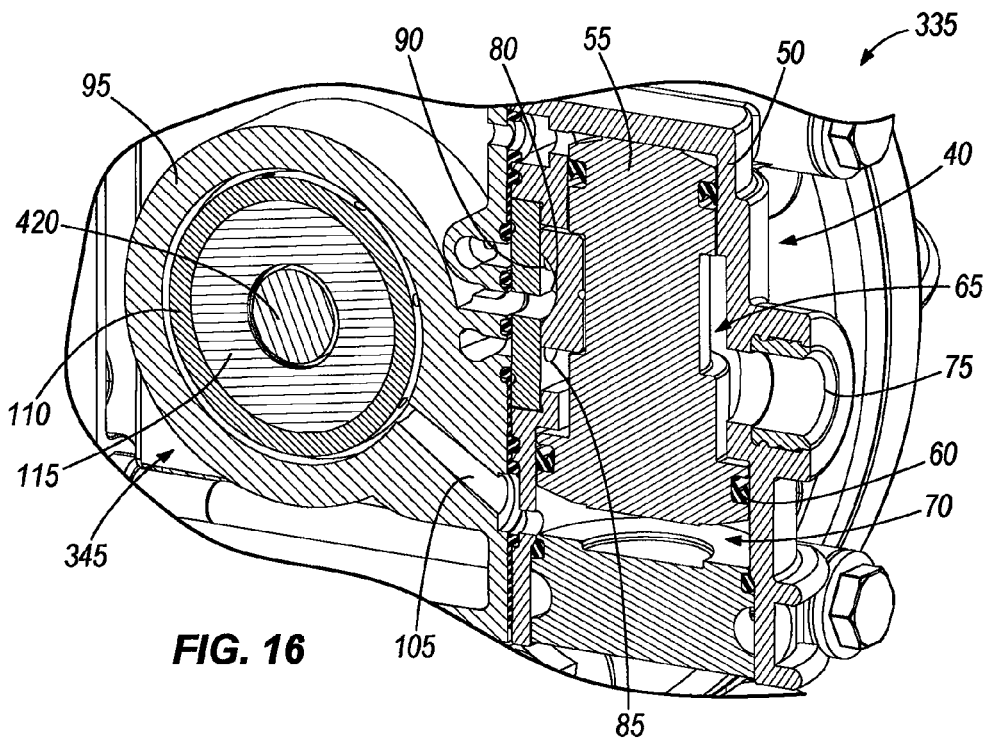
FIG. 16 is a cross-sectional view of the valve assembly of the pump taken along line 16-16 in FIG. 13 and illustrating a power valve of the valve assembly in a second position.
Figure 17:
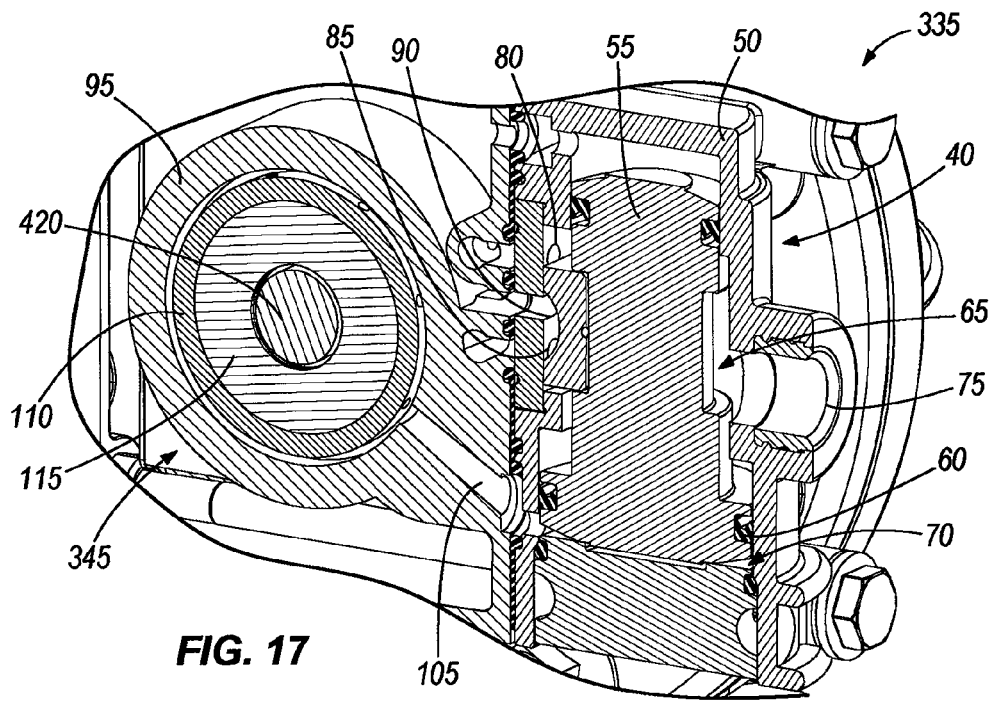
FIG. 17 is a cross-sectional view of the valve assembly illustrating the power valve in a first position.
Figure 18:
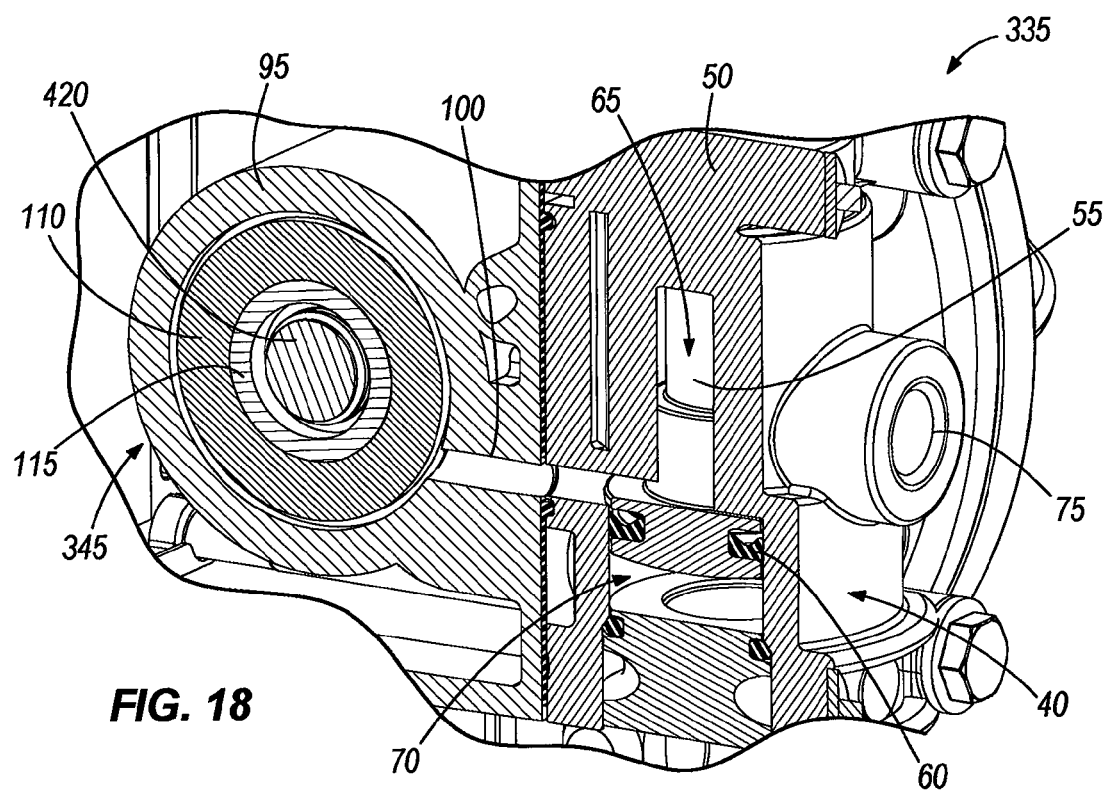
FIG. 18 is a cross-sectional view of the pump taken along line 18-18 in FIG. 13
Figure 19:
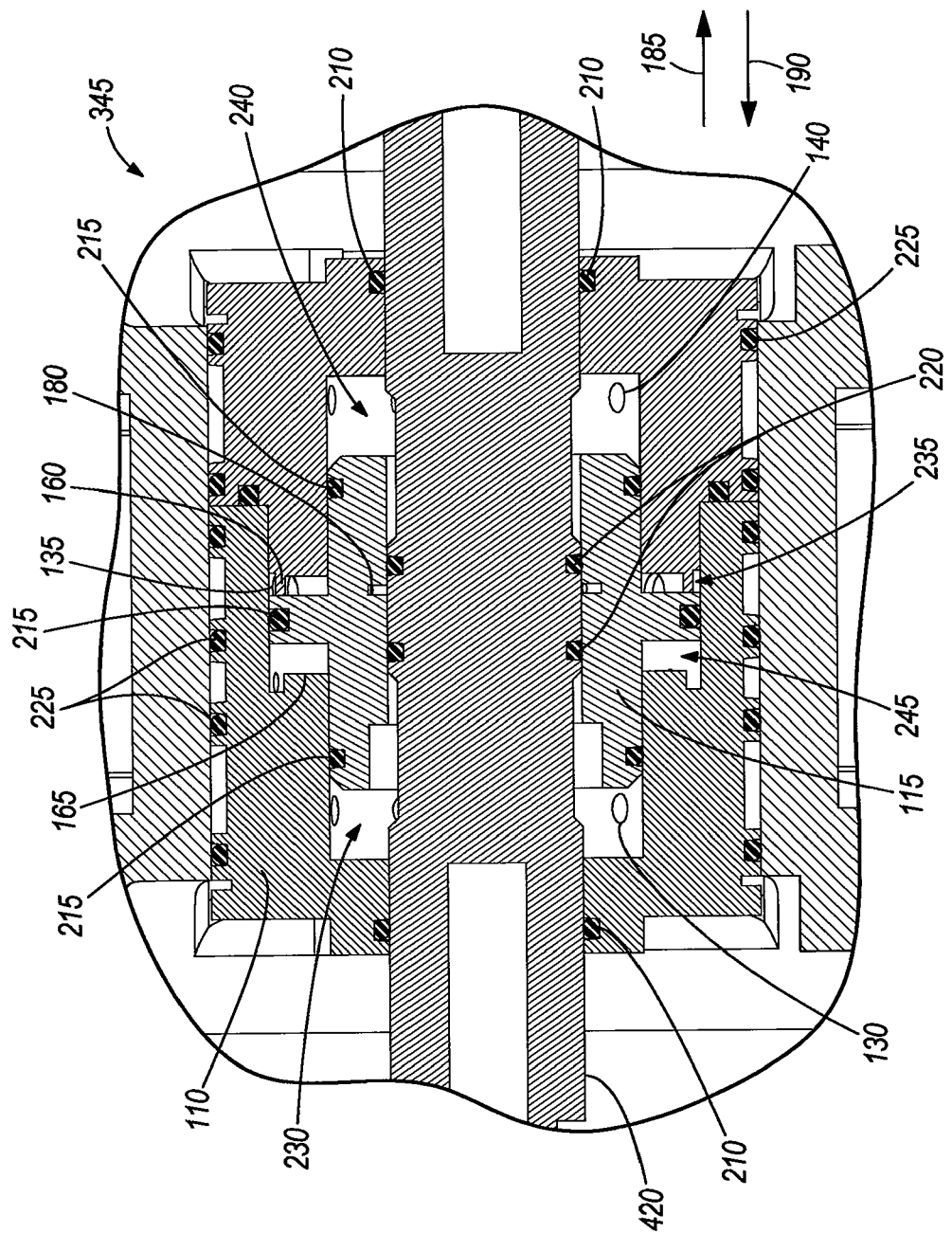
FIG. 19 is a cross-sectional view of a pilot valve of the valve assembly moving into an on condition.
Figure 20:
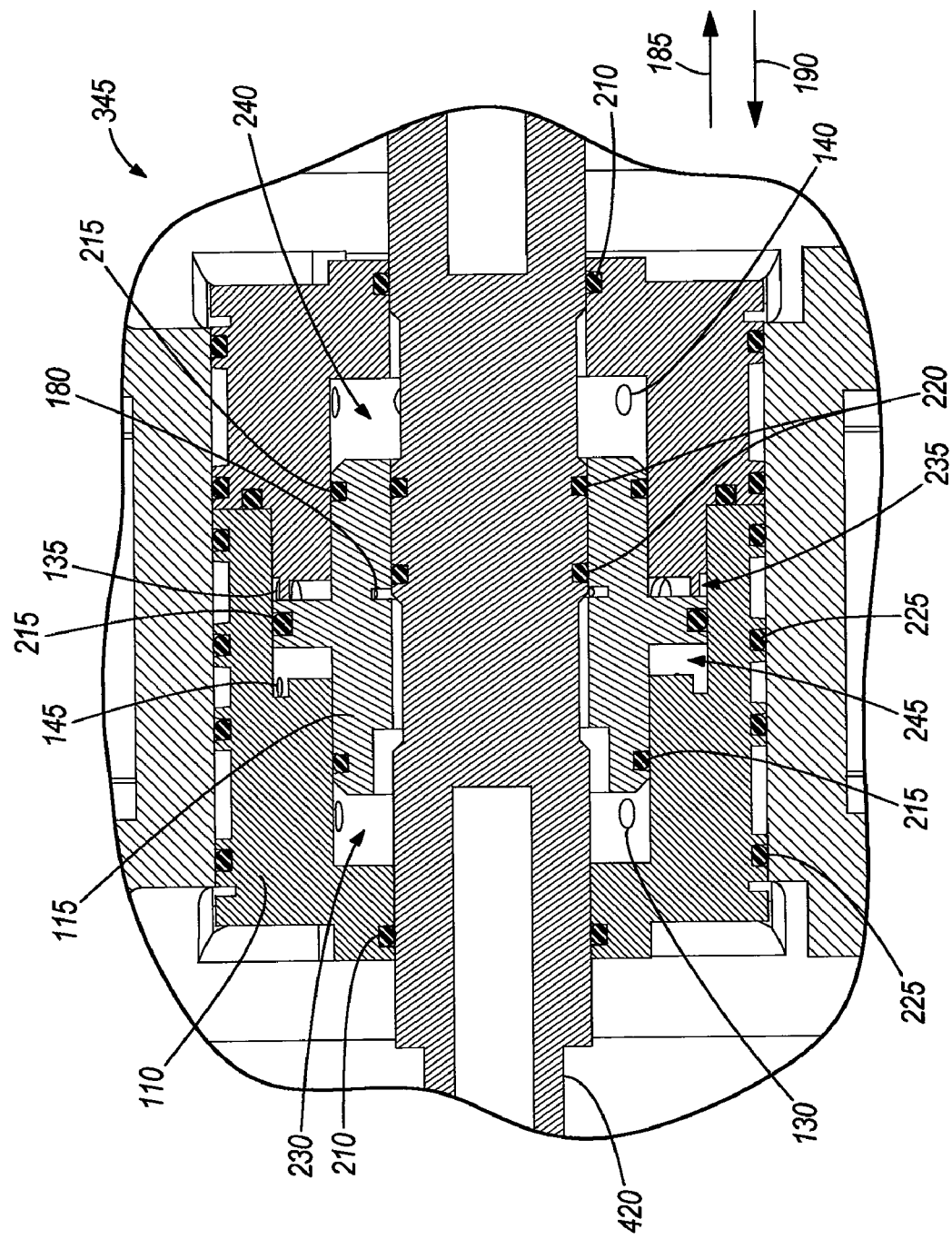
FIG. 20 is a cross-sectional view of the pilot valve moving further into the on condition.
Figure 21:
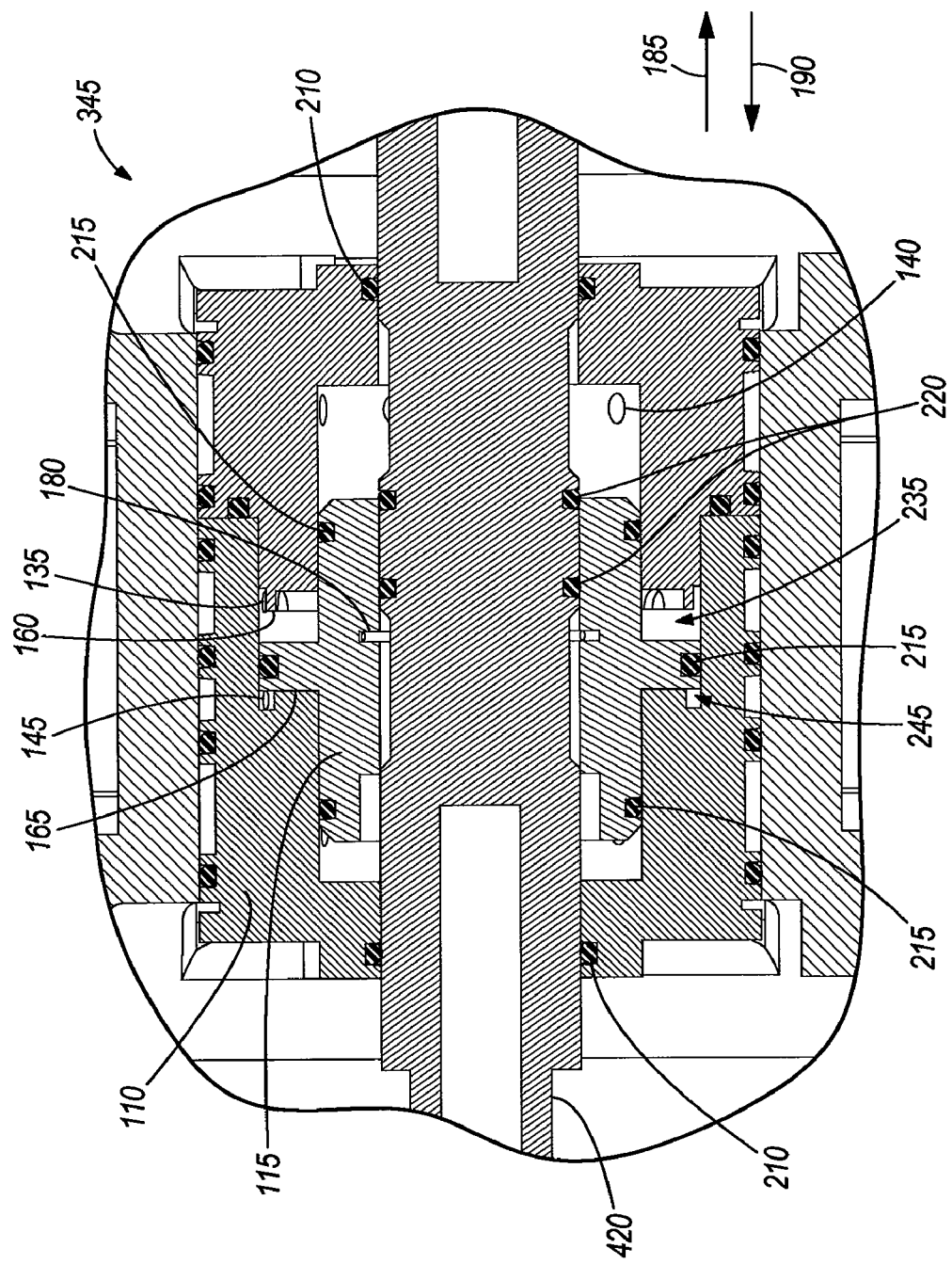
FIG. 21 is a cross-sectional view of the pilot valve in the on condition.
Figure 22:
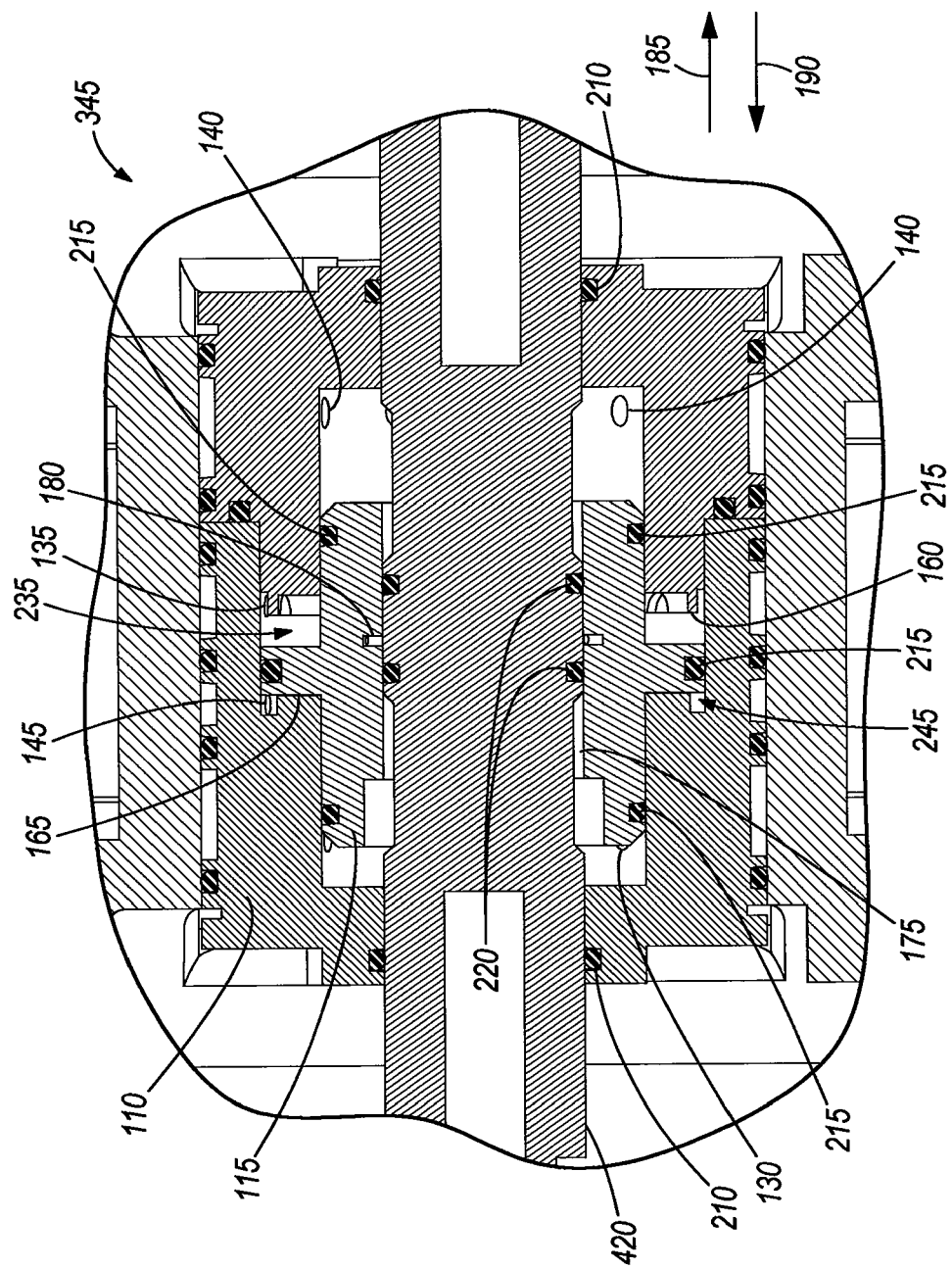
FIG. 22 is a cross-sectional view of the pilot valve moving into an off condition.
Figure 23:
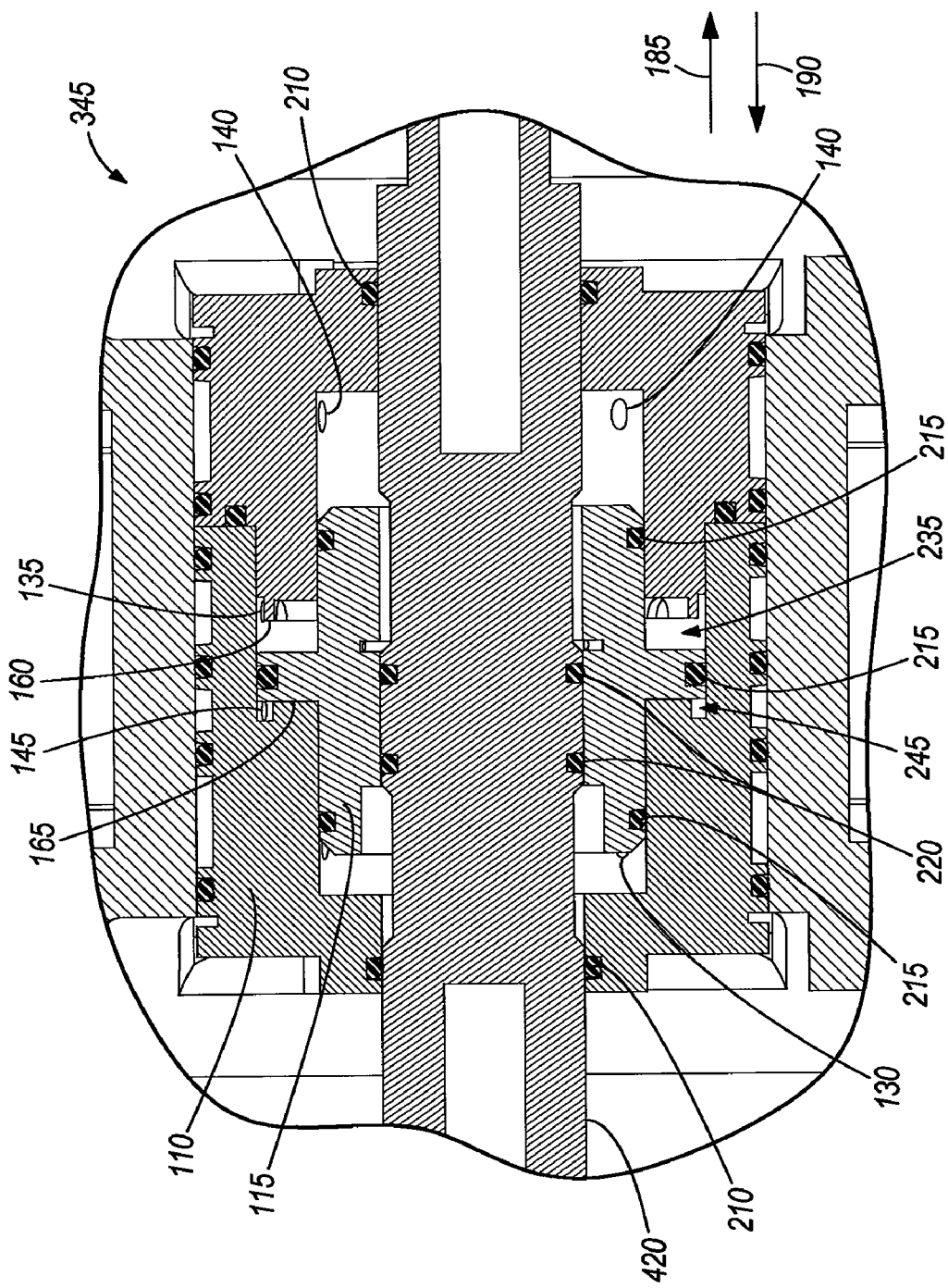
FIG. 23 is a cross-sectional view of the pilot valve moving further into the off condition.
Figure 24:
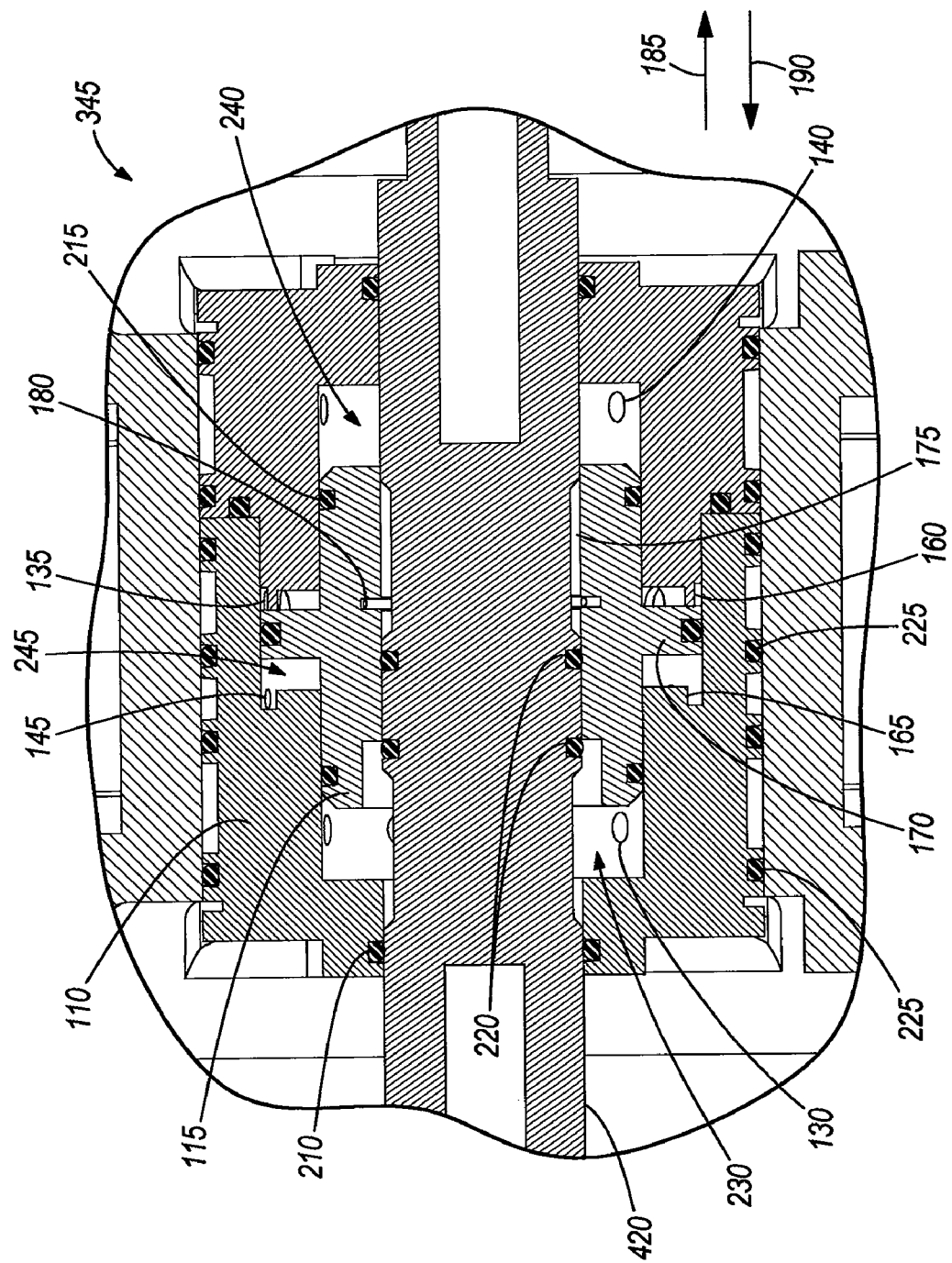
FIG. 24 is a cross-sectional view of the pilot valve in the off condition.

The valve assembly 335 includes a power valve 40 (FIGS. 16-18) that is substantially similar to the power valve 40 described above. The valve assembly 335 includes a different pilot valve 345 (FIGS. 14-24). The pilot valve 345 includes the valve body 110, the piston 115 within the valve body 110, and a rod 420 extending through the valve body 110 and the piston 115. With reference to FIGS. 14 and 15, the rod 420 is coupled at its opposite ends to the first and second diaphragms 20D, 23D for synchronized reciprocating movement. Thus, in this embodiment, the pilot valve 345 combines the functionality of the connecting rod 30 and pilot rod 120 of the previous embodiment into the single rod 420 element.

A complete cycle of operation of the valve assembly 335 is as follows. With the pilot valve 345 in the off condition illustrated in FIG. 24, there is no pilot signal to the pilot chamber 70 in the power valve 40. In this condition, supply air is directed to the motive fluid chamber 23B while the other motive fluid chamber 20B is placed into communication with the atmosphere. The diaphragms 20D, 23D and rod 420 shift to in the first direction 185 as a result of the motive fluid chamber 23B filling with motive fluid (FIG. 14).

The pilot valve 345 shifts into the on position in three steps or phases. In the first phase (FIG. 19), one of the third seals 220 crosses the gland 180, such that the outlet chamber 235 is cut off from communicating with both the inlet chamber 230 and the first exhaust chamber 240 (this provides an anti-stalling function as described above). In the second phase, (FIG. 20), the second third seal 220 crosses the gland 180, which places the outlet chamber 235 and the pilot chamber 70 of the power valve 40 in communication with motive fluid from the inlet chamber 230. In the third phase (FIG. 21), the biasing force from the outlet chamber 235 side of the piston 115 overcomes the biasing force from the inlet chamber 230 side due to the larger net surface area on the outlet chamber 235 side, and the piston 115 is biased in the second direction 190 against the second stop 165 to place the pilot valve 345 in the on position. In response to receiving the pilot signal in the pilot chamber 70, the power valve 40 shifts into the second position (FIG. 16) and directs motive fluid into the motive fluid chamber 20B and places the motive fluid chamber 23B in communication with the atmosphere. As a result, the diaphragms 20D, 23D and rod 420 shift to in the second direction 190.

As the rod 420 shifts in the second direction 190, the pilot valve 345 shifts into the off condition in three steps of phases. In the first phase (FIG. 22), one of the third seals 220 crosses the gland 180, such that the outlet chamber 235 is cut off from communicating with both the inlet chamber 230 and the first exhaust chamber 240 (this provides an anti-stalling function as described above). In the second phase, (FIG. 23), the second third seal 220 crosses the gland 180, which places the outlet chamber 235 and the pilot chamber 70 of the power valve 40 in communication with atmospheric pressure through the first exhaust chamber 240. In the third phase (FIG. 24), the biasing force from the inlet chamber 230 side of the piston 115 biases the piston 115 in the first direction 185 against the first stop 160 to place the pilot valve 345 in the off position. The pilot chamber 70 in the power valve 40 is now at atmospheric pressure, the power valve 40 shifts into the first position (FIG. 17), and the cycle starts over.

As with the first embodiment, the rod 420 in this embodiment, which switches the pilot signal on and off as it moves, meets no resistance to axial movement due to motive fluid pressures within the valve arrangement 335 because the net surface area exposed to the motive fluid is substantially zero.

Various features and advantages of the invention are set forth in the following claims.

What is claimed is:

1. A valve arrangement for placing a supply of motive fluid in alternating communication with first and second motive fluid chambers, the valve arrangement comprising:
   a power valve including a supply chamber, a pilot chamber, and a shiftable member separating the supply chamber from the pilot chamber, the supply chamber adapted to constantly communicate with the supply of motive fluid, the shiftable member adapted to shift into a first position in response to the pilot chamber being pressurized with motive fluid and into a second position in response to the pilot chamber being at atmospheric pressure, the shiftable member placing the supply chamber in communication with the first motive fluid chamber in response to the shiftable member being in the first position, and placing the supply chamber in communication with the second motive fluid chamber in response to the shiftable member being in the second position; and
   a pilot valve actuable between an on condition in which the pilot valve places the pilot chamber in communication with the supply of motive fluid, and an off condition in which the pilot valve places the pilot chamber in communication with the atmosphere;
   wherein the pilot valve includes a passageway, a pilot actuator extending through the passageway and slidable within the passageway between first and second positions, and a sealing member carried by the pilot actuator and providing an impermeable seal between the pilot actuator and the passageway;
   wherein movement of the pilot actuator into the first position places the pilot valve into the on condition and movement of the pilot actuator into the second position places the pilot valve into the off condition; and
   wherein sliding movement of the pilot actuator within the passageway between the first and second positions is free from any resistance other than the seal between the pilot actuator and the passageway.

2. The valve arrangement of claim 1, wherein the pilot valve includes an inlet chamber adapted for constant communication with the supply of motive fluid and an exhaust chamber in constant communication with the atmosphere; and wherein movement of the pilot actuator into the first position places the pilot chamber of the power valve in communication with the inlet chamber through the passageway; and wherein movement of the pilot actuator into the second position places the pilot chamber of the power valve in communication with the exhaust chamber through the passageway.

3. The valve arrangement of claim 2, wherein the inlet chamber of the pilot valve is in constant communication with the supply chamber of the power valve, such that the pilot valve places the pilot chamber of the power valve in communication with the supply chamber of the power valve through the passageway in the pilot valve when the pilot valve is in the on condition.

4. The valve arrangement of claim 2, wherein a first portion of the pilot actuator extends from the sealing member into the inlet chamber; and wherein the sum of all surface areas of the first portion of the pilot actuator gives rise to a net zero actuating force arising from pressure of motive fluid surrounding the first portion of the pilot actuator.

5. The valve arrangement of claim 2, wherein the pilot valve includes a pilot piston shiftable with respect to the pilot actuator; wherein the pilot piston defines the passageway and a gland communicating between the pilot chamber of the power valve and the passageway; wherein the sealing member comprises a pair of spaced apart seals carried by the pilot actuator, each creating an impermeable seal between the pilot actuator and the pilot piston within the passageway; wherein actuation of the pilot actuator between the first and second positions causes the pair of seals to cut off communication between the pilot chamber and both of the inlet chamber and exhaust chamber through the passageway when the pair of sealing members are positioned in the passageway between the gland and the respective inlet chamber and exhaust chamber; and wherein the pair of spaced apart seals prevent the inlet chamber and exhaust chamber of the pilot valve from ever communicating with each other through the passageway.

6. The valve arrangement of claim 2, wherein the pilot valve includes a pilot piston shiftable with respect to the pilot actuator; wherein the pilot piston defines the passageway and a gland communicating between the pilot chamber of the power valve and the passageway; wherein the pilot valve includes an outlet chamber constantly communicating between the gland and the pilot chamber; wherein the pilot piston includes a first surface area facing the inlet chamber and a second surface area facing the outlet chamber, the first and second surface areas being unequal; wherein motive fluid acting only on the first surface area shifts the pilot piston in a first direction to increase spacing between the sealing member and the gland in response to the pilot valve being in the off condition; and wherein motive fluid acting on both the first and second surface areas shifts the pilot piston in a second direction to increase spacing between the sealing member and the gland in response to the pilot valve being in the on condition.

7. A pilot valve for turning a pilot signal on and off, the pilot valve comprising:
   a valve body including an inlet chamber and an outlet chamber, the inlet chamber adapted to be in constant communication with a source of motive fluid;
   a piston movable within the valve body and including a passageway communicating with the inlet chamber and a gland communicating between the passageway and the outlet chamber;
   a rod movable within the passageway; and
   at least one seal carried by the rod and creating an impermeable sliding seal between the rod and piston within the passageway;
   wherein the rod is actuable in a first direction to move the at least one seal to a first side of the gland and place the inlet chamber in communication with the outlet chamber through the passageway and gland, and thereby turn the pilot signal on;
   wherein the rod is actuable in a second direction to move the at least one seal to a second side of the gland to cut off communication between the inlet chamber and outlet chamber through the passageway and gland, and thereby turn the pilot signal off;
   wherein a portion of the rod extends into the inlet chamber; and
   wherein the portion of the rod extending into the inlet chamber has a net zero surface area against which the motive fluid bears, such that the motive fluid does not bias the rod in either of the first and second directions.

8. The pilot valve of claim 7, wherein the valve body further includes an exhaust chamber communicating with the passageway; wherein the at least one seal comprises a pair of spaced apart seals; wherein actuation of the rod at least temporarily positions one of the pair of seals to be on the first side of the gland and the other of the pair of seals to be on the second side of the gland to cause the pair of seals to cut off communication between the outlet chamber and both of the inlet chamber and exhaust chamber through the passageway as the rod is shifted to turn the pilot signal on and off; and wherein the pair of spaced apart seals prevent the inlet chamber and exhaust chamber of the pilot valve from ever communicating with each other through the passageway.

9. The valve arrangement of claim 7, wherein the pilot piston includes a first surface area facing the inlet chamber and a second surface area facing the outlet chamber, the first and second surface areas being unequal; wherein motive fluid acting only on the first surface area shifts the pilot piston in the first direction to increase spacing between the at least one seal and the gland in response to the rod being shifted in the second direction and the at least one seal being moved to the second side of the gland; and wherein motive fluid acting on both the first and second surface areas shifts the pilot piston in the second direction to increase spacing between the pair of seals and the gland in response to the rod being shifted in the first direction and the at least one seal being moved to the first side of the gland.

10. The valve arrangement of claim 2, wherein the pilot valve further includes a pilot piston defining the passageway; wherein the pilot piston includes a gland that is in constant communication with the pilot chamber of the power valve; and wherein the passageway communicates with each of the inlet chamber, exhaust chamber, and gland; wherein movement of the pilot actuator into the first position moves the sealing member across the gland and places the sealing member on a first side of the gland to open communication between the inlet chamber and the gland through the passageway; wherein movement of the pilot actuator into the second position moves the sealing member across the gland and places the sealing member on a second side of the gland opposite the first side of the gland; wherein motive fluid in the inlet chamber biases the pilot piston in a first direction with respect to the pilot actuator while the sealing member is on the second side of the gland to increase a space between the sealing member and the gland; and wherein motive fluid flowing through the gland while the sealing member is on the first side of the gland biases the pilot piston in a second direction, opposite the first direction, with respect to the pilot actuator to increase a space between the sealing member and the gland.

11. The valve arrangement of claim 1, wherein the pilot valve includes an inlet chamber that is constantly supplied with motive fluid, an exhaust chamber that is constantly in communication with the atmosphere, a gland that is in constant communication with the pilot chamber of the power valve, and a passageway that communicates with each of the inlet chamber, exhaust chamber, and gland; wherein movement of the pilot actuator to the first position moves the sealing member across the gland to a first side of the gland to cut off communication between the gland and the exhaust chamber through the passageway, while opening communication between the pilot chamber and the inlet chamber through the passageway and gland, such that the pilot valve is in the on condition; and wherein movement of the pilot actuator in a second direction opposite the first direction moves the sealing member across the gland to a second side of the gland to cut off communication between the gland and the inlet chamber through the passageway, while opening communication between the pilot chamber and the exhaust chamber through the passageway and gland, such that the pilot valve is in the off condition.

* * * * *